US009320042B2

(12) United States Patent
Ono et al.

(10) Patent No.: US 9,320,042 B2
(45) Date of Patent: Apr. 19, 2016

(54) WIRELESS COMMUNICATION SYSTEM WITH MULTIPLE BASE STATIONS COOPERATING TO TRANSMIT DATA

(75) Inventors: Go Ono, Musashino (JP); Kenzaburo Fujishima, Yokohama (JP); Mikio Kuwahara, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 774 days.

(21) Appl. No.: 13/639,779

(22) PCT Filed: Apr. 9, 2010

(86) PCT No.: PCT/JP2010/002589
§ 371 (c)(1),
(2), (4) Date: Nov. 16, 2012

(87) PCT Pub. No.: WO2011/125131
PCT Pub. Date: Oct. 13, 2011

(65) Prior Publication Data
US 2013/0201896 A1     Aug. 8, 2013

(51) Int. Cl.
*H04H 20/71*     (2008.01)
*H04W 72/08*     (2009.01)
*H04B 7/02*     (2006.01)
(Continued)

(52) U.S. Cl.
CPC .............. *H04W 72/08* (2013.01); *H04B 7/024* (2013.01); *H04B 7/0434* (2013.01); *H04B 17/309* (2015.01); *H04B 17/382* (2015.01);
(Continued)

(58) Field of Classification Search
CPC .................................................... H04W 72/08
See application file for complete search history.

(56) References Cited

U.S. PATENT DOCUMENTS

2005/0101328 A1*   5/2005   Son et al. ............... 455/436
2006/0166665 A1*   7/2006   Shinoi .................. 455/426.1
(Continued)

FOREIGN PATENT DOCUMENTS

JP     2007-043332 A     2/2007
JP     2009-516936 A     4/2009
(Continued)

OTHER PUBLICATIONS

PCT International Search Report on application PCT/JP2010/002589 mailed Jul. 6, 2010; 1 page.
(Continued)

*Primary Examiner* — Hassan Kizou
*Assistant Examiner* — Abdelnabi Musa
(74) *Attorney, Agent, or Firm* — Foley & Lardner LLP

(57) ABSTRACT

The present invention is directed to achievement of a data transmission control to cause base stations to cooperate with one another, taking into account efficient use of radio resources. A wireless communication system, which is an aspect of the present invention, includes: a first base station; a second base station connected via a wired network; and a wireless communication terminal that conducts at least one of single data transmission in which a single base station transmits data and cooperative data transmission in which a plurality of base stations cooperate to transmit data. The base stations notify the wireless communication terminal of a condition indicating a case where the cooperative data transmission can be performed. If the communication quality of the propagation path meets the condition, the wireless communication terminal transmits, to the base stations, information that is required for the cooperative data transmission.

20 Claims, 23 Drawing Sheets

(51) Int. Cl.
*H04B 7/04* (2006.01)
*H04L 5/00* (2006.01)
*H04B 17/309* (2015.01)
*H04B 17/382* (2015.01)
*H04W 92/20* (2009.01)

(52) U.S. Cl.
CPC .......... *H04L5/0035* (2013.01); *H04L 5/0057* (2013.01); *H04L 5/0098* (2013.01); *H04W 92/20* (2013.01)

(56) References Cited

U.S. PATENT DOCUMENTS

| | | | |
|---|---|---|---|
| 2007/0248172 | A1 | 10/2007 | Mehta et al. |
| 2007/0263734 | A1* | 11/2007 | Seki ............................. 375/259 |
| 2008/0310405 | A1* | 12/2008 | Cox et al. ..................... 370/354 |
| 2009/0207822 | A1* | 8/2009 | Kim et al. ..................... 370/338 |
| 2009/0215464 | A1 | 8/2009 | Tanno et al. |
| 2009/0232113 | A1* | 9/2009 | Tamaki ......................... 370/337 |
| 2010/0222063 | A1 | 9/2010 | Ishikura et al. |
| 2011/0134875 | A1 | 6/2011 | Ding et al. |
| 2011/0305195 | A1* | 12/2011 | Forck et al. .................. 370/328 |

FOREIGN PATENT DOCUMENTS

| | | |
|---|---|---|
| JP | 2009-231983 A | 10/2009 |
| JP | 2009-278656 A | 11/2009 |
| JP | 2010-502114 A | 1/2010 |
| WO | WO 2008/022243 A2 | 2/2008 |
| WO | WO 2010/016607 A1 | 2/2010 |

OTHER PUBLICATIONS

3$^{rd}$ Generation Partnership Project; Technical Specification Group Radio Access Network; Evolved Universal Terrestrial Radio Access (E-UTRA); LTE Physical Layer—General Description (Release 8); 3GPP TS 36.201 V.8.1.0 (Nov. 2007); pp. 1-13.

3rd Generation Partnership Project; Technical Specification Group Radio Access Network; Evolved Universal Terrestrial Radio Access (E-UTRA); Physical Channels and Modulation (Release 8); 3GPP TS 36.211 V.8.4.0 2008-09); pp. 1-78.

3$^{rd}$ Generation Partnership Project; Technical Specification Group Radio Access Network; Evolved Universal Terrestrial Radio Access (E-UTRA); Multiplexing and channel coding (Release 8); 3GPP TS 1 36.212 V.8.4.0 (Sep. 2008); pp. 1-56.

3$^{rd}$ Generation Partnership Project; Technical Specification Group Radio Access Network; Evolved Universal Terrestrial Radio Access (E-UTRA); Physical layer procedures (Release 8); 3GPP TS 36.213 V.8.4.0 (Sep. 2008); pp. 1-60.

3$^{rd}$ Generation Partnership Project; Technical Specification Group Radio Access Network; Further Advancements for E-UTRA Physical Layer Aspects (Release X); 3GPP TR 36.814 V0.0.1 (Sep. 2008); pp. 1-8.

Mailender, Laurence; Indoor Network MIMO Performance with Regularized Zero-forcing Transmission; 2008; pp. 129-132.

Japan Patent Office; Notification of Reasons for Refusal on application 2014-070868 mailed Oct. 21, 2014; pp. 1-2.

\* cited by examiner

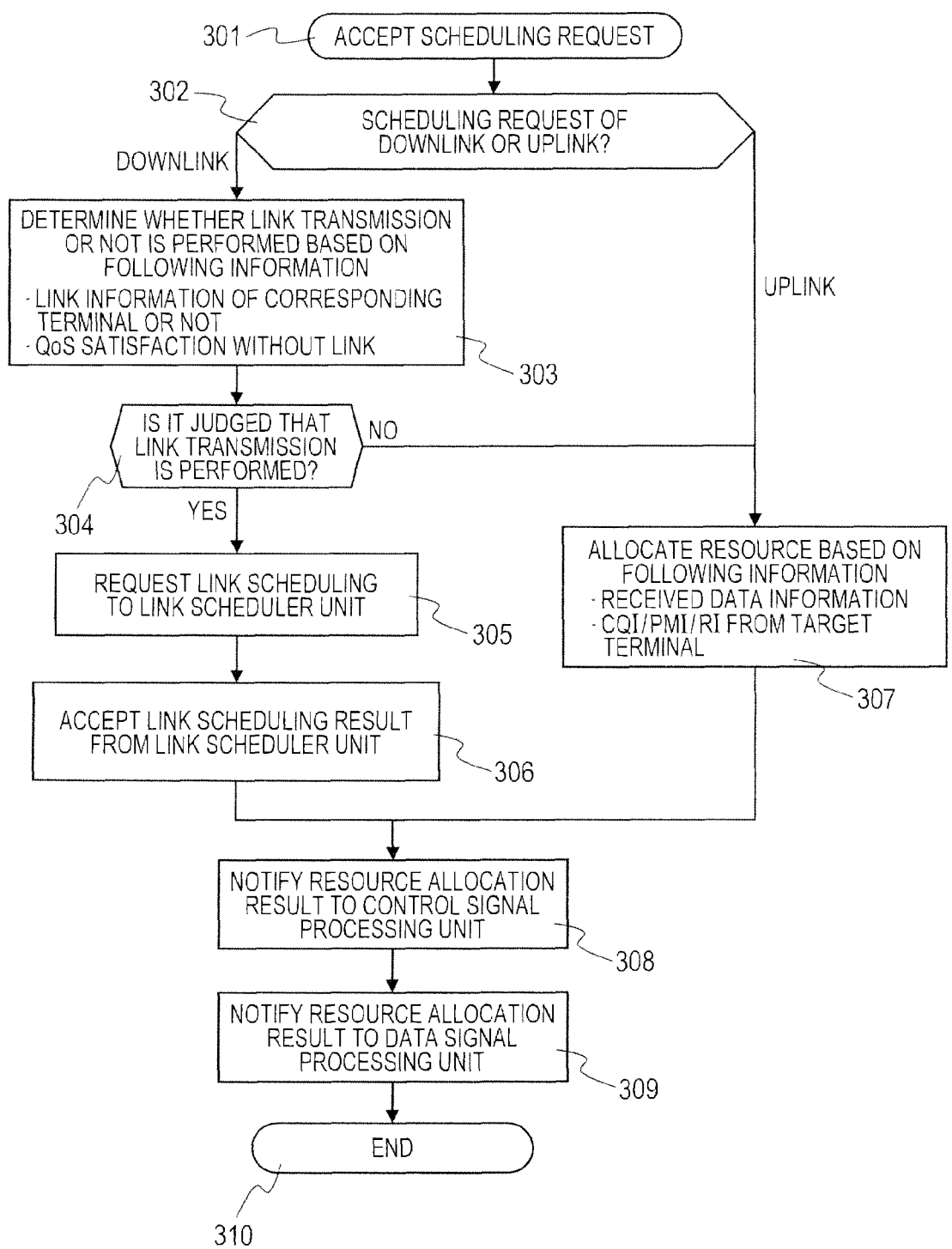

FIG. 19

| 551 | 552 | 553 | 554 | 555 |
|---|---|---|---|---|
| TERMINAL | DATA ARRIVAL TIME | DATA AMOUNT | LINK MOMENT THROUGHPUT | AVERAGE THROUGHPUT |
| TERMINAL #1 | aaaa | bbbb | cccc | dddd |
| ⋮ | | | | |

FIG. 20

| 561 CQI VALUE | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| NUMBER OF TERMINALS 562 | | | | | | | | | | | | | | | | |

↑ THRESHOLD

WIRELESS COMMUNICATION SYSTEM WITH MULTIPLE BASE STATIONS COOPERATING TO TRANSMIT DATA

TECHNICAL FIELD

The present invention relates to a wireless communication system with a plurality of base stations, and more particularly, to a wireless communication system in which a plurality of base stations cooperate to transmit data to one or more wireless communication terminals.

BACKGROUND ART

In a wireless communication system, a wireless communication terminal at a cell edge has a signal to interference and noise ratio (SINR) which is deteriorated and cannot acquire sufficient user rate by an influence by distance attenuation of desired wave power from an affiliated base station and an interference wave from a neighboring base station. As a technology that addresses the above problem and improves the user rate of the cell edge wireless communication terminal, a base station cooperation technology in which the base stations cooperate to transmit data to the wireless communication terminal was known. Even in long term evolution-advanced (LTE-A) (Non-patent Literature 3) which is a successor to $3^{rd}$ generation partnership project (3GPP) long term evolution (LTE) (Non-patent Literature 1 and 2) which has been widely adopted globally as a $3.9^{th}$ generation wireless communication system, and a first candidate of a $4^{th}$ generation wireless communication system, it is expected that the base station cooperation technology will be included in a standard.

In the 3GPP, the base station cooperation technology is classified into two types of coordinated scheduling and joint processing and is under examination. The coordinated scheduling is a technology, that each base station makes a transmission signal have strong directivity by using beam forming (BF) and signals are prevented from being overlapped between neighboring base stations, to avoid interference and improve the SINR. Meanwhile, the joint processing is a technology in which the plurality of base stations transmits data to one terminal simultaneously to improve a transmission rate. A transmission mode at the time of simultaneously transmitting data from the plurality of base stations includes site diversity in which the plurality of base stations transmits the same signal and improves desired signal power in the terminal and multipoint MIMO in which MIMO transmission is performed by using a plurality of antennas of the plurality of base stations. Herein, an operation of the multipoint MIMO will be described with the operation being divided into single user (SU) transmission (one wireless communication terminal is selected and data is transmitted to the wireless communication terminal) and multi user (MU)-MIMO transmission (data is transmitted to a plurality of wireless communication terminals by applying MIMO). Further, in the following description, orthogonal frequency division multiple access (OFDM) adopted as downlink of LTE is assumed as a multiple access of a radio resource, but in the present description the multiple access of the radio resource is not limited to the OFDMA but may be applied to even other multiple access such as time division multiple access (TDMA), code division multiple access (CDMA), and the like.

In the SU transmission, the wireless communication terminal receives pilot signals from its affiliated base station and a neighboring base station, and estimates a channel. Further, the quality of the channel, the number of ranks of the MIMO, and a desired precoding matrix are calculated when the multipoint MIMO transmission is used based on the channel estimation result. The wireless communication terminal transmits at least one of them and a list of base stations that participate in cooperative transmission to its affiliated base station by using an uplink control signal. The base station receiving them notifies information thereon to a cooperation schedule unit serving to allocate the radio resource in base station cooperation. The cooperation schedule unit selects an optimal wireless communication terminal, a data transmission mode, used subcarriers, and the like based on the information thereon, and notifies the result to the cooperative transmission base station. Further, the optimal wireless communication terminal can be selected every subcarrier of the OFDMA. For example, when network MIMO transmission is performed between base stations 1 and 2 and wireless communication terminals 1 and 2, both base stations may perform multipoint MIMO communication with respect to the wireless communication terminal 1 in subcarriers 1 to 12 and both base stations may perform the multipoint MIMO communication with respect to the wireless communication terminal 2 in subcarriers 13 to 24.

As the multipoint MIMO transmission mode in the SU transmission, (1) open-loop MIMO transmission not requiring designation of the precoding matrix from the wireless communication terminal is performed and the wireless communication terminal performs reception in minimum mean square error (MMSE) or maximum likelihood detection (MLD) like general MIMO. (2) Closed-loop MIMO transmission such as Eigen space division multiplexing (E-SDM), and the like is used. (3) Transmission diversity using space time transmit diversity (STTD), and the like can be used. Even in any case, before transmission to the wireless communication terminal, base stations that perform cooperative transmission exchange required data and thereafter, each base station generates a signal based on each mode and transmits the generated signal to a target wireless communication terminal. The wireless communication terminal decodes the signal based on the mode selected by the base station, and receives data. Even in any mode of (1) to (3) described above, since the wireless communication terminal which is a target of the MIMO transmission receives its desired signal instead of interference from the base station that participates in cooperation, a channel capacity is significantly improved.

Meanwhile, even in the MU-MIMO transmission, the wireless communication terminal receives the pilot signal from its affiliated base station and the neighboring base station, and estimates the channel, similarly as one wireless communication terminal transmission. Further, the quality of the channel, the number of ranks of the MIMO, a desired precoding matrix, and a channel matrix with the plurality of base stations are calculated when the multipoint MIMO transmission is used based on the channel estimation result. The wireless communication terminal transmits at least one of them and a list of base stations that participate in cooperative transmission to its affiliated base station by using an uplink control signal. The base station receiving them notifies information thereon to a cooperation schedule unit serving to allocate the radio resource in base station cooperation. The cooperation schedule unit selects a combination of optimal wireless communication terminals, a data transmission mode, used subcarriers, and the like based on the information thereon, and notifies the result to the cooperative transmission base station. Further, the combination of the optimal wireless communication terminals can be selected every subcarrier of the OFDMA. For example, when network MIMO transmission is performed between base stations 1 and 2 and wireless communication terminals 1, 2, and 3, both base stations may perform network MIMO communication with respect to the wireless communication terminals 1 and 2 in subcarriers 1 to 12 and both base stations may perform the network MIMO communication with respect to the wireless communication terminal 2 and 3 in subcarriers 13 to 24.

As the multipoint MIMO transmission mode in the MU-MIMO transmission, (1) a zero forcing (ZF) mode in which a transmitter performs precoding by an inverse matrix of a channel matrix is used (Non-patent Literature 4). (2) A mode using dirty paper coding (DPC) of improving a channel capacity by using information on an interference signal is considered. The ZF can be implemented according to a simple principle, but amplification over an upper limit of transmission power is required according to the inverse matrix of the channel matrix, and as a result, there is a problem in that the channel capacity deteriorates. Meanwhile, the DPC is more excellent than the ZF in terms of channel capacity, but there is a problem in that a calculation amount is large. Accordingly, as one of the implementation modes of the DPC, a mode using LQ decomposition is known. In this mode, the channel matrix is resolved into the multiplication of a lower triangular matrix and a unitary matrix, and the transmitter performs preliminary equalizing processing based the lower triangular matrix and precoding by Hermitian transposition of the unitary matrix. This sequence is a calculation amount which can be installed in actuality, and further, since the unitary matrix is used in the precoding, extreme amplification of a signal amplitude as in the ZF does not occur. As a result, in the wireless communication terminal, interference from a neighboring cell is cancelled, and thus the channel capacity is improved.

CITATION LIST

Non-Patent Literature

Non-patent Literature 1: 3GPP TS 36.201 v8.1.0 (2007-11)
Non-patent Literature 2: 3GPP TS 36.211, TS 36.212, TS 36.213 v8.4.0 (2008-9)
Non-patent Literature 3: 3GPP TR 36.814 V0.0.1 (2008-9)
Non-patent Literature 4: Laurence Mailaender, "Indoor Network MIMO Performance with Regularized Zero-Forcing Transmission", IEEE ISSSTA 2008, pp. 124-128, '08/8

SUMMARY OF INVENTION

Technical Problem

In general, the wireless communication terminals periodically transmit the control signal to notify the channel quality between their affiliated base stations to the base stations. Further, when the MIMO transmission is performed, the number of ranks of the MIMO and an index of the desired precoding matrix also need to be transmitted. In addition, in order for the base stations to cooperate with each other to transmit data, each wireless communication terminal needs to periodically transmit the quality of the channel, the number of ranks of the MIMO, and the index of the desired precoding matrix to the base station at the time of performing cooperative transmission by using the radio resource of the uplink. Further, at the time of performing transmission to the plurality of wireless communication terminals, a channel matrix between all base stations that participate in cooperative transmission with the wireless communication terminal also needs to be transmitted to the base station by using the radio resource of the uplink. As such, each wireless communication terminal consumes the radio resource of the uplink in order to transmit information required for the cooperation to the base station. Therefore, when the wireless communication terminals affiliated in the base station becomes more and more, the consumption of the uplink radio resource used for transmitting the information required for the cooperation increases, and as a result, a radio resource which can be used for user data transmission of the uplink is compressed.

Further, in order to perform the cooperative data transmission, a calculation amount required for the base stations to allocate the radio resource increases, that is, a processing amount of the cooperation schedule unit increases. For example, allocation of the radio resource to one resource block is considered. Herein, the resource block is a unit used to allocate the radio resource and is a set of successive subcarriers. In data transmission by a single base station that does not use the cooperation, in the case of the SU transmission, the optima wireless communication terminal is selected and in the case of the MU-MIMO transmission, the combination of the optimal wireless communication terminals is selected, from the wireless communication terminals affiliated to the base station. Meanwhile, in the data transmission cooperated by the base stations, the optimal wireless communication terminals or the combination thereof need to be selected among all wireless communication terminals affiliated to the plurality of base stations that participates in the cooperation. Further, the combinations of the base stations that participate in the cooperation or combinations to adopt any one of the aforementioned cooperation modes are multiple, and complexity in allocating the radio resource in the cooperative transmission sharply increases as compared with the radio resource allocation in the single base station. In actuality, since the resource blocks are multiple (for example, the maximum number of resource blocks in the LTE is 110), the radio resource allocation becomes complicated.

Solution to Problem

In order to address at least one of the problems, a wireless communication system according to an aspect of the present invention includes: a first base station; a second base station connected through a wired network; and a wireless communication terminal performing at least one of single data transmission in which data is transmitted from one base station and cooperative data transmission in which a plurality of base stations cooperate to transmit data, and the base station notifies a condition indicating a case in which cooperative data transmission is capable of being performed to the wireless communication terminal and the wireless communication terminal transmits to the base station information required for the cooperative data transmission when a communication quality of a propagation path coincides with the condition.

Herein, the condition means, for example, that the communication quality of the propagation path is less than the threshold.

Advantageous Effect of Invention

According to one aspect of the present invention, the communication resource is not unnecessarily used in the information required for the cooperative data transmission but the resource can be allocated to transmission of user data therebeside.

BRIEF DESCRIPTION OF DRAWINGS

FIG. 6A is a diagram illustrating a flow (at the time of accepting a scheduling request) of an in-base station scheduler.

FIG. 19 is a diagram illustrating a database used for cooperation scheduling.

FIG. 20 is a diagram illustrating a CQI distribution table.

DESCRIPTION OF EMBODIMENTS

In embodiments to be described below, it is assumed that OFDMA is used in a multiple access of downlink data transmission and single carrier-frequency division multiple access (SC-FDMA) is used in a multiple access of uplink data transmission, by referring to 3GPP LTE, but an application scope of the present invention is not limited to a wireless communication system using these multiple access and the present invention may also be applied other multiple communication access including CDMA and TDMA.

First Embodiment

The embodiment discloses a sequence at the time of determining a threshold associated with the presence of data transmission (hereinafter, referred to as cooperative transmission) performed by cooperation of base stations cooperate based on information (hereinafter, referred to as single transmission information) required in single base station transmission in which a wireless communication terminal performs periodical transmission, and notifying the result to the wireless communication terminal. Further, in determining the threshold of the presence of the cooperative transmission, processing will also be described, which determines a total amount of information (hereinafter, referred to as cooperative information) required for the cooperative transmission which the wireless communication terminal transmits not to be more than a predetermined value.

Prior to describing the sequence, first, a block diagram of an entire network configuration, and the base station and the wireless communication terminal will be described.

Figure 2:
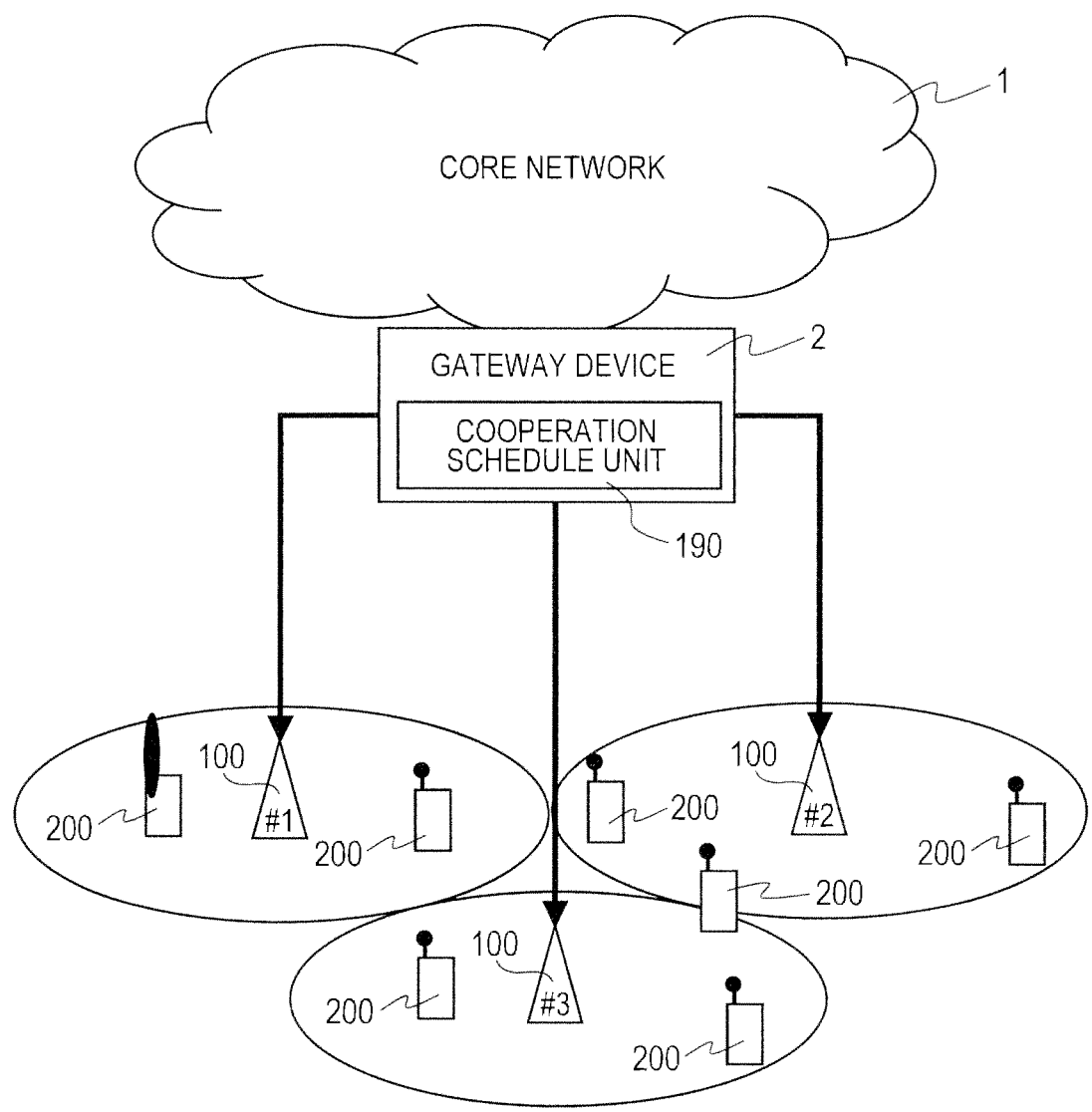
FIG. 2 is a network configuration diagram illustrating a wireless communication system.

FIG. 2 illustrates a network configuration corresponding to a wireless communication system of the embodiment. In the wireless communication system, a plurality of base stations 100 is placed and respective cells are configured, and further, a wireless communication terminal 200 affiliated in each base station 100 is scattered in the cell. Further, each base station 100 is connected with a core network 1 through a gateway device 2. It is assumed that the base station 100 and the gateway device 2 are connected with each other in a wired manner by using an optical fiber, and the like (however, although the base station 100 and the gateway device 2 are connected with each other in a wireless manner, application of the embodiment is not interrupted). In addition, the gateway device 2 has a cooperation schedule unit 190 serving to allocate a radio resource in the cooperative transmission and each base station 100 has a communication interface (IF) with the cooperation schedule unit. Further, in the following description, the cooperation schedule unit 190 is placed in the gateway device 2, but the cooperation schedule unit 190 is separately installed as a separate device, but may be installed in any one base station 100 and all of the configurations do not interrupt application of the embodiment.

Figure 3:
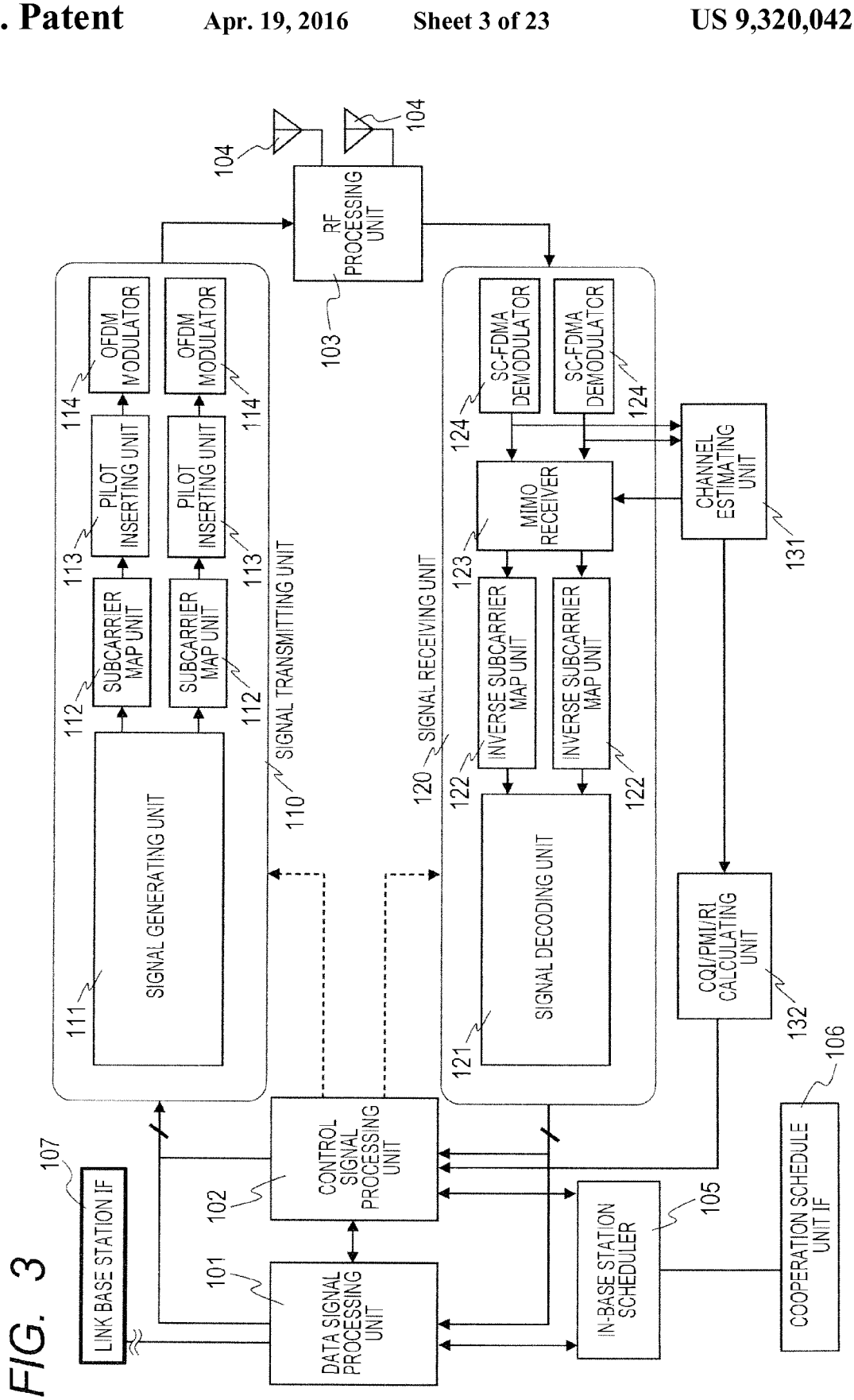
FIG. 3 is a diagram illustrating a device configuration example of a base station.

FIG. 3 is a diagram illustrating a device configuration example of the base station 100. User data transmitted to the wireless communication terminal 200, which is received from the gateway device 2 is accumulated in a buffer of a data signal processing unit 101 and transmitted to a signal transmitting unit 110 as the radio resource is allocated. Meanwhile, the user data transmitted from a signal receiving unit 120 to the data signal processing unit 101 is transmitted to the core network 1 through the gateway device 2. Further, a control signal processing unit 102 transmits and receives a control signal between the base station 100 and the wireless communication terminal 200 through the signal transmitting unit 110 and the signal receiving unit 120 as necessary. In addition, an in-base station scheduler 105 serves to allocate the radio resource associated with the single base station transmission, and performs scheduling based on information from the data signal processing unit 101 and the control signal processing unit 102, and notifies the result. Further, in order to implement the cooperative transmission, the in-base station scheduler 105 has a cooperation schedule unit interface (IF) 106 which is an interface between the in-base station scheduler 105 and the cooperation schedule unit 190, and the data signal processing unit 101 has a cooperation base station IF 107 which is an interface between the data signal processing unit 101 and the base station 100 as well as performing the cooperative transmission.

When the signal transmitting unit 110 accepts a data signal from the data signal processing unit 101 or the control signal from the control signal processing unit 102, the signal transmitting unit 110 first performs processing such as error correction encoding, modulation, precoding, and the like, and generates a symbol transmitted from each antenna by using a signal generating unit 111. A subcarrier map unit 112 assigns the symbol to any one subcarrier among OFDMA symbols. Subsequently, a pilot inserting unit 113 inserts a pilot symbol which the wireless communication terminal 200 uses to estimate a channel of downlink into an appropriate position. Finally, an OFDM modulator 114 performs inverse discrete Fourier transform (IDFT) processing or insertion of a cyclic prefix (CP), and outputs a baseband OFDM signal. The baseband OFDM signal output by the signal transmitting unit 110 is sent to an RF processing unit 103, digital-analog conversion, subjected to up-convert, and amplification processing are performed independently, and transmitted from an antenna 104 to the wireless communication terminal 200.

Meanwhile, when the antenna 104 receives the signal from the wireless communication terminal 200, the RF processing unit 103 performs amplification processing, down-convert, and analog-digital conversion processing, and transmits the signal to an SC-FDMA demodulator 124. The SC-FDMA demodulator 124 performs removal of the CP, DFT processing, and IDFT processing for receiving the SC-FDM, transmits a pilot signal part in the output to a channel estimating unit 131, and transmits other parts to an MIMO receiver 123. The channel estimating unit 131 performs channel estimation of uplink based on the pilot signal and transmits an estimated channel matrix to the MIMO receiver 123 and a CQI/PMI/RI calculating unit 132. The MIMO receiver 123 performs MIMO reception processing using MMSE or MLD with respect to an output of the SC-FDMA demodulator 124 based on the channel matrix, and transmits an output for each layer to an inverse subcarrier map unit 122.

The inverse subcarrier map unit 122 performs inverse processing to the processing performed by the subcarrier map unit 212 in the wireless communication terminal 200 and outputs a received symbol affiliation. A signal decoding unit 121 performs demodulation and error correction decoding of the output and among signals acquired as the result, transmits a user data signal to the data signal processing unit 101 and the control signal to the control signal processing unit 102. Further, the CQI/PMI/RI calculating unit 132 calculates channel quality indication (CQI), a precoding matrix indication (PMI, a precoding matrix desired by the wireless communication terminal), and a rank indication (RI, a rank in the MIMO transmission) of uplink, based on the channel matrix, and notifies the calculated indications to the control signal processing unit 102. The notified CQI, PMI, or RI is held by the control signal processing unit 102 or held by a memory which the control signal processing unit 102 may refer to.

Operational flows of the in-base station scheduler 105, the control signal processing unit 102, and the data signal processing unit 101 in the base station 100 will be described with reference to FIGS. 6, 7, and 8, respectively.

Figure 6B:
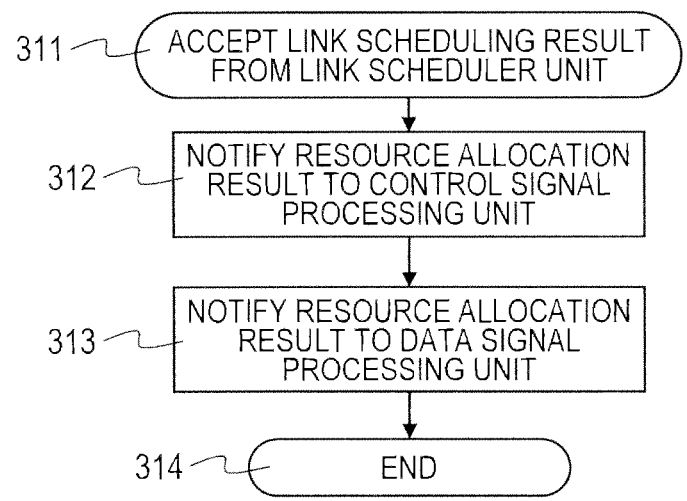
FIG. 6B is a diagram illustrating a flow (at the time of accepting a cooperation scheduling request) of the in-base station scheduler.
Figure 7A:
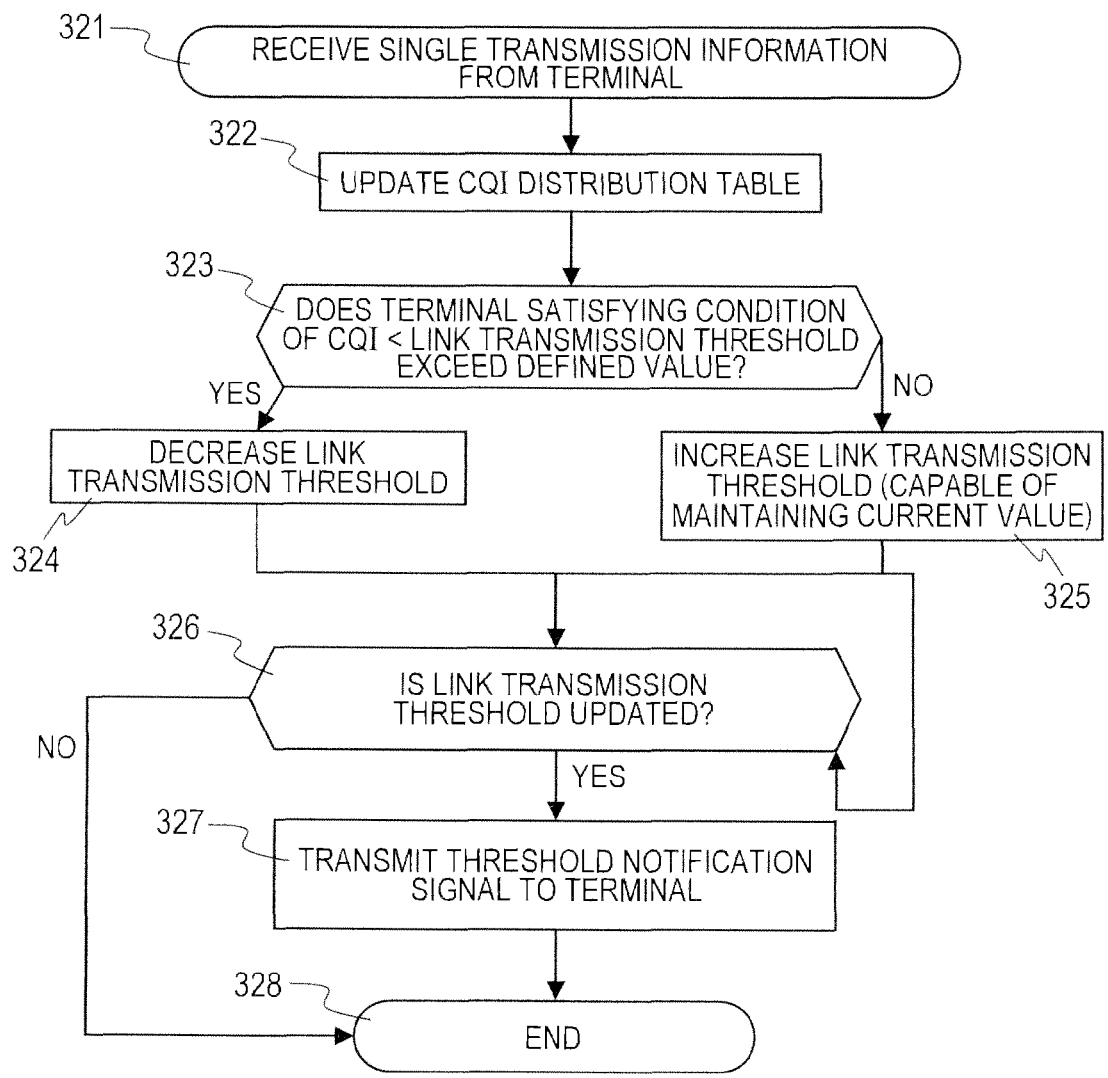
FIG. 7A is a diagram illustrating a flow (at the time of receiving single transmission information) of a control signal processing unit in a base station.
Figure 7B:
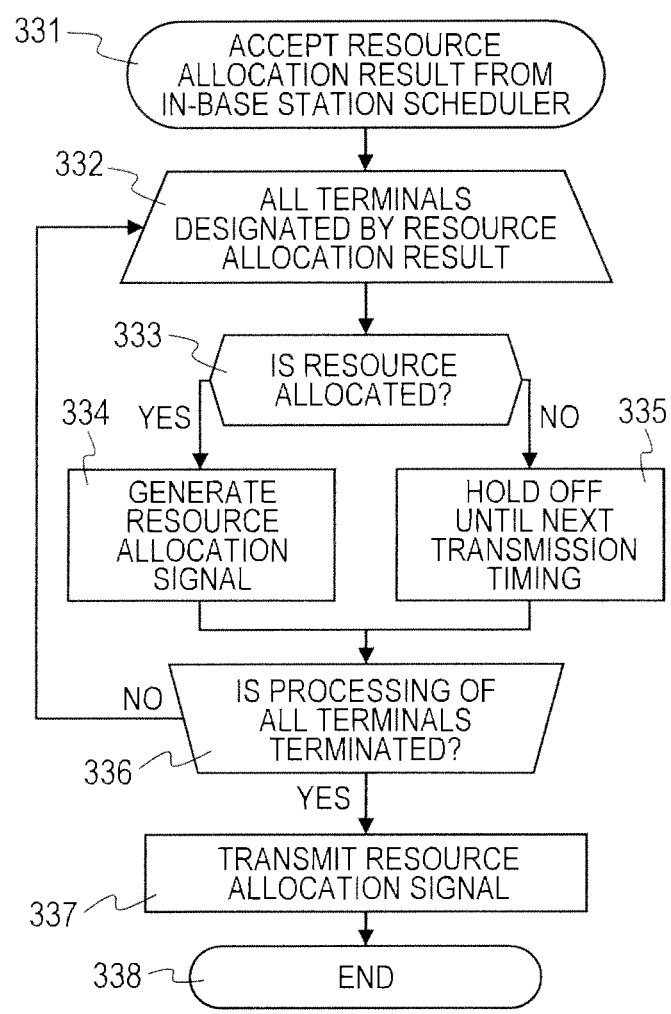
FIG. 7B is a diagram illustrating a flow (at the time of accepting a resource allocation result) of the control signal processing unit in the base station.
Figure 7C:
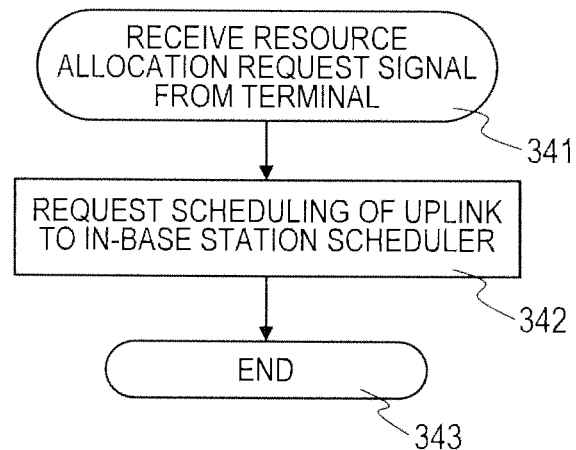
FIG. 7C is a diagram illustrating a flow (at the time of receiving a resource allocation request) of the control signal processing unit in the base station.
Figure 8A:
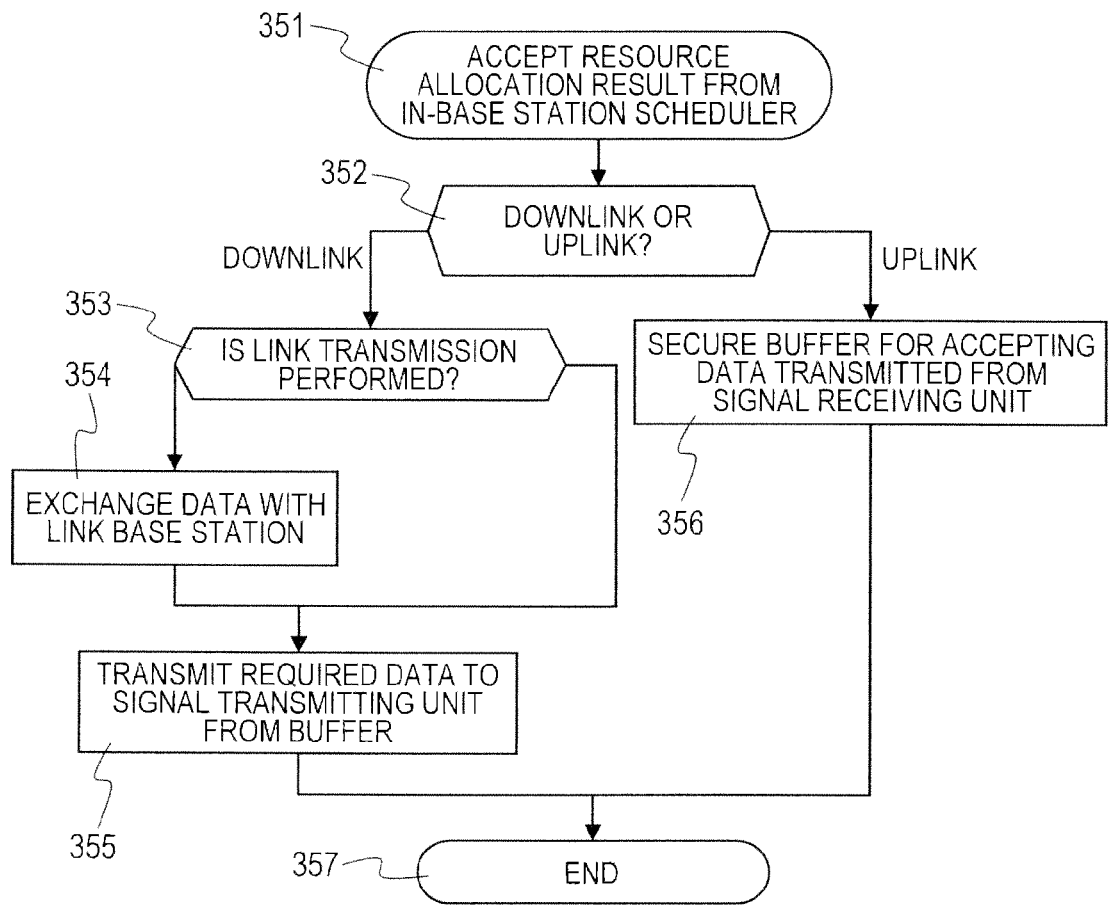
FIG. 8A is a diagram illustrating a flow (at the time of accepting the resource allocation result) of a data signal processing unit in the base station.
Figure 8B:
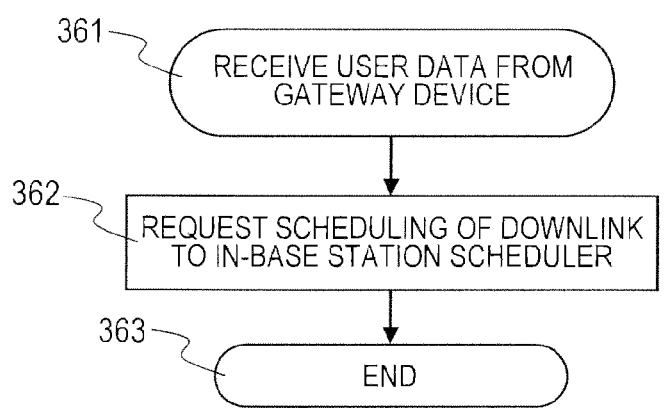
FIG. 8B is a diagram illustrating a flow (at the time of receiving user data) of the data signal processing unit in the base station.

FIG. 6A is an operational flow when the in-base station scheduler 105 accepts a scheduling request 342 in FIGS. 7C and 362 in FIG. 8B from the control signal processing unit 102 or the data signal processing unit 101. When the in-base station scheduler 105 accepts the scheduling request 301 in FIG. 6A, the in-base station scheduler 105 first judges whether the accepted scheduling request is a scheduling request of downlink or uplink (302). In the case of the scheduling request of downlink, the in-base station scheduler 105 judges whether or not to perform cooperative transmission (303). In detail, it is judged that the cooperative transmission is performed when cooperation information of the corresponding wireless communication terminal 200 has been acquired and required quality of service (QoS) may not be satisfied without cooperation. A subsequent operation is branched by the judgment result (304). When it is judged that the cooperative transmission is required, the in-base station scheduler 105 requests cooperation scheduling to the cooperation schedule unit 190 through a cooperation schedule unit IF 106 (305). Thereafter, when the in-base station scheduler 105 accepts a cooperation scheduling result 410 in FIG. 10 from the cooperation schedule unit 190 (306), the in-base station scheduler 105 notifies the result to the control signal processing unit 102 and the data signal processing unit 101 (308 and 309), and terminates the processing (310). Meanwhile, when it is judged that the cooperative transmission is not required (No in 304), the in-base station scheduler 105 allocates the radio resource by single base station transmission based on data information (for example, a data mount, QoS, and the like) and the CQI, PMI, and RI of downlink, which are received (307).

In addition, the in-base station scheduler 105 notifies an allocation result of the radio resource to the control signal processing unit 102 and the data signal processing unit 101 in 307 (308 and 309), and terminates the processing (310). Meanwhile, in the case of the scheduling request of uplink in 302, the in-base station scheduler 105 allocates the radio resource by the single base station transmission based on the data information (for example, the QoS, and the like) and the CQI, PMI, and RI of uplink, which are received (307), notifies the result to the control signal processing unit 102 and the data signal processing unit 101 (308 and 309), and terminates the processing (310).

Figure 10:
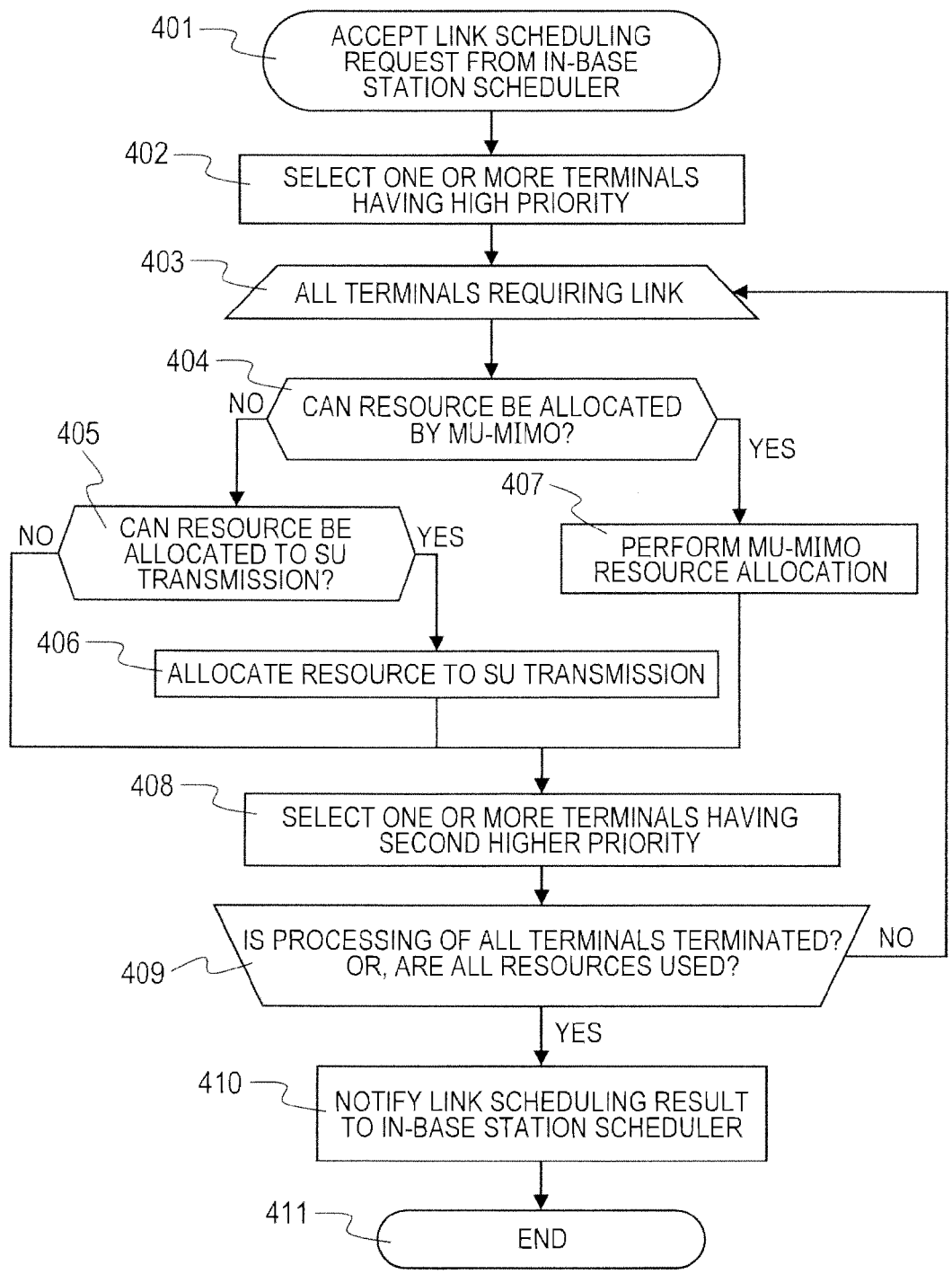
FIG. 10 is a diagram illustrating a flow of a cooperation schedule unit.

FIG. 6B is an operational flow when the in-base station scheduler 105 accepts the cooperation scheduling result notified by the cooperation schedule unit 190 (410 in FIG. 10). When the in-base station scheduler 105 accepts the cooperation scheduling result (311 in FIG. 6B), the in-base station scheduler 105 notifies the result to the control signal processing unit 102 and the data signal processing unit 101 (312 and 313), and terminates the processing (314). Further, in FIG. 6A, when the cooperation scheduling request is performed by judging that the cooperative transmission is performed in its own base station, the cooperation scheduling result is accepted (305 and 306), while in FIG. 6B, when the cooperative data transmission is requested from other base stations, the cooperation scheduling result is accepted (313).

FIG. 7A is an operational flow when the control signal processing unit 102 of the base station receives single transmission information from the wireless communication terminal 200. When the control signal processing unit 102 receives single transmission information (321), the control signal processing unit 102 extracts a CQI value in single transmission included therein. Further, the CQI includes a wideband CQI indicating the quality of a wide band or a subband CQI indicating a CQI for each subband, but in the following description, the wideband CQI is set as a target and simply referred to as the CQI. In addition, the control signal processing unit 102 updates its own CQI distribution table based on the CQI value (322).

Herein, the CQI distribution table is a table illustrated in FIG. 20. The table illustrates a histogram of the CQI value of the wireless communication terminal 200 affiliated in the base station 100 and indicates a wireless communication terminal number (562) for each CQI value (561). The CQI distribution table is held by the control signal processing unit 102 or held by a memory medium such as the memory which the control signal processing unit 102 may refer to, and the like.

That is, in 322 of FIG. 7A, the control signal processing unit 102 increases the number of terminals to corresponding to the received CQI value by 1 and updates the CQI distribution table.

Subsequently, the control signal processing unit 102 refers to the CQI distribution table and judges whether the number of wireless communication terminals 200 satisfying 'CQI<cooperative transmission threshold' is more than a predetermined value (323). In detail, when the wireless communication terminal number (562) in which the CQI value (561) is i is n(i), it is judged whether '$\Sigma\_(i=0: \text{threshold})n(i) > $the predetermined value' is satisfied. Further, the predetermined value described herein is, in advance, determined based on the amount of radio resources of uplink allocated to the cooperation information transmission or an allowable interference amount. When n(i) is more than the result (Yes in 323), the number of wireless communication terminals 200 that transmit a cooperative transmission information notification signal is excessive and the radio resource of uplink is compressed. Therefore, in order to avoid the problem, the control signal processing unit 102 decreases a value of the cooperative transmission threshold so as to prevent the number of the wireless communication terminals 200 satisfying 'CQI<cooperative transmission threshold' from being more than the predetermined value (324). In detail, a maximum I satisfying '$\Sigma\_(i=0)n(i) < $the predetermined value' is set as the value of the cooperative transmission threshold. Meanwhile, when the judgment result in 323 is negative (No), the radio resource of uplink required for the cooperative transmission information notification signal is afforded. Therefore, in this case, the control signal processing unit 102 increases the number of wireless communication terminals that transmit the cooperative transmission information notification signal by increasing the value of the cooperative transmission threshold (325). Further, the number of the wireless communication terminals need not be increased and an actual state may be maintained. In addition, when the cooperative transmission threshold is updated (326), the control signal processing unit 102 transmits a threshold notification signal to the wireless communication terminal 200 (327) in order to allow the terminal to know the updated value and terminates the processing (328). Meanwhile, when the cooperative transmission threshold is not updated, the threshold notification signal is not transmitted and the processing is terminated.

Further, in FIG. 7, the threshold transmitted to the terminal is determined by referring to the CQI distribution table, but may be determined by other methods and set by an input from the outside.

FIG. 7B is an operational flow when the control signal processing unit 102 accepts the in-base station scheduler resource allocation result 308 in FIGS. 6A and 312 in FIG. 6B. When the control signal processing unit 102 accepts the resource allocation result (331), the control signal processing unit 102 repeats the following processing with respect to all wireless communication terminals designated as the resource allocation result (332). First, the control signal processing unit 102 examines whether the radio resource is allocated to the corresponding wireless communication terminal 200 (333) and if so, the control signal processing unit 102 generates the resource allocation signal (334). Herein, the resource allocation signal is a signal for notifying the radio resource allocated to the wireless communication terminal 200 and a packet format thereof will be described below with reference to FIG. 11B. Meanwhile, the control signal processing unit 102 postpones data transmission to a wireless communication terminal 200 to which the resource is not allocated until a next transmission timing (335). As the next transmission timing, for example, a next subframe transmission timing is considered in the case of LTE. The above processing is repeatedly performed with respect to all of the wireless communication terminals and when the processing is terminated (336), the generated resource allocation signal is transmitted (337) and the processing is terminated (338).

FIG. 7C is an operational flow when the control signal processing unit 102 receives a resource allocation request signal from the wireless communication terminal 200 (341). In this case, uplink scheduling is requested to the in-base station scheduler 105 (342) and the processing is terminated (343).

Figure 7D:
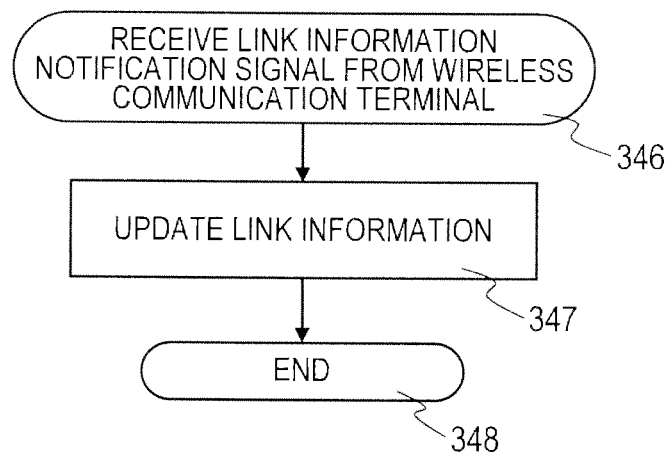
FIG. 7D is a diagram illustrating a flow (at the time of receiving a cooperation information notification signal) of the control signal processing unit in the base station.
Figure 9A:
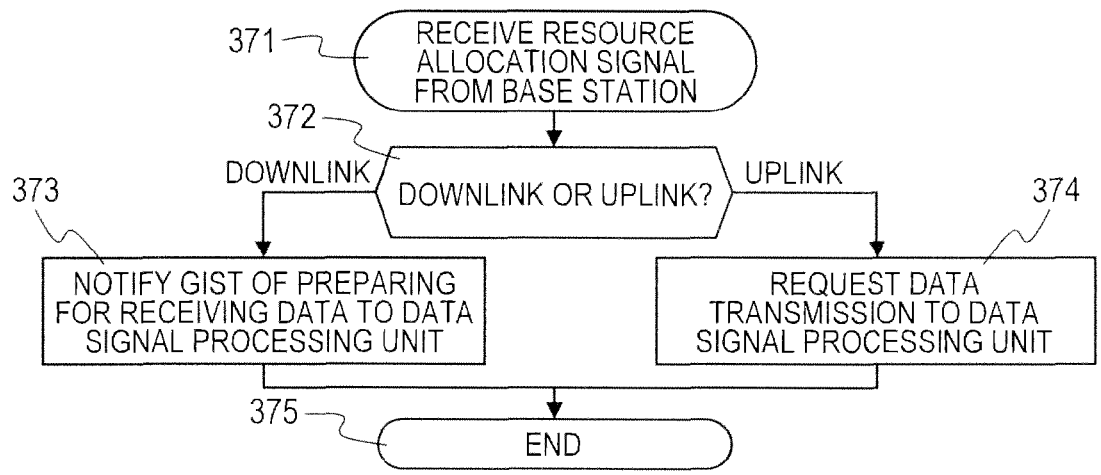
FIG. 9A is a diagram illustrating a flow (at the time of receiving a resource allocation signal) of a control signal processing unit in a terminal.
Figure 9B:
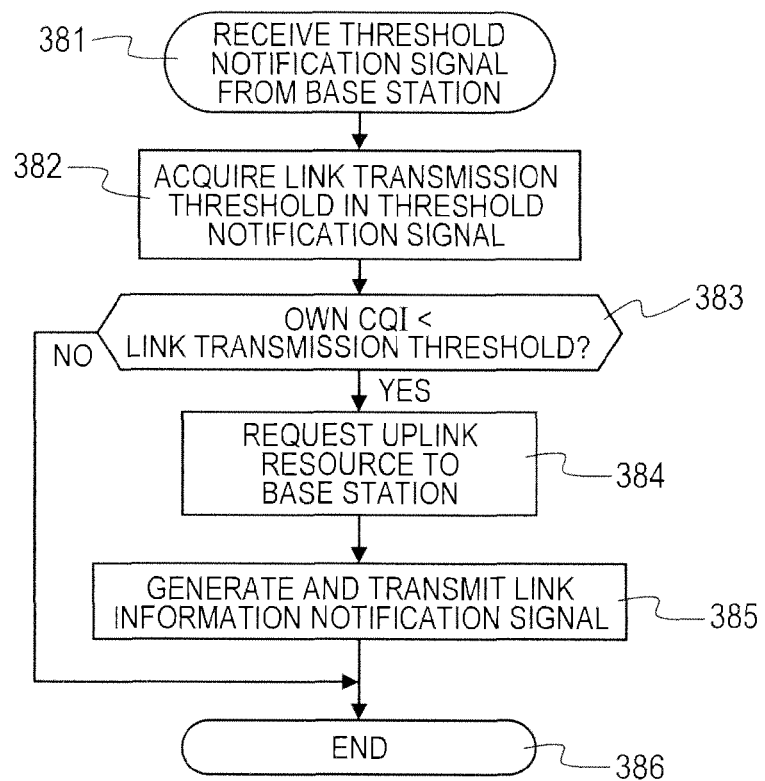
FIG. 9B is a diagram illustrating a flow (at the time of receiving a threshold notification signal) of the control signal processing unit in the terminal.

FIG. 7D is a flow when the control signal processing unit 102 receives the cooperation information notification signal transmitted by the wireless communication terminal 200 (385 in FIG. 9B). The control signal processing unit 102 that receives the cooperation information notification signal (346) updates held cooperation information (347) and terminates the processing (348). A format of the cooperation information notification signal, and the like will be described below in detail with reference to FIG. 12.

FIG. 8A is an operational flow when the data signal processing unit 101 of the base station accepts the resource allocation result 309 in FIGS. 6A and 313 in FIG. 6B from the in-base station scheduler. The data signal processing unit 101 first judges whether the resource allocation is resource allocation of downlink or uplink (352) when accepting the resource allocation result (351). In the case of the resource allocation of downlink, the data signal processing unit 101 judges whether or not to perform the cooperative transmission (353) and exchanges user data required between the data signal processing unit 101 and other base station 100 that participate in the cooperative transmission when the cooperative transmission is performed (354). Thereafter, regardless of the cooperation, the data signal processing unit 101 transmits required data from the buffer in the data signal processing unit 101 to the signal transmitting unit 110 (355), and terminates the processing (357). Meanwhile, in the case of the resource allocation of uplink, the data signal processing unit 101 ensures the buffer by providing for receiving the data (356).

FIG. 8B is an operational flow when the data signal processing unit 101 receives user data transmitted from the gateway device 2 to the wireless communication terminal 200.

The data signal processing unit 101 requests scheduling of downlink to the in-base station scheduler 105 (362), and terminates the processing (363) when receiving the user data (361).

Figure 4:
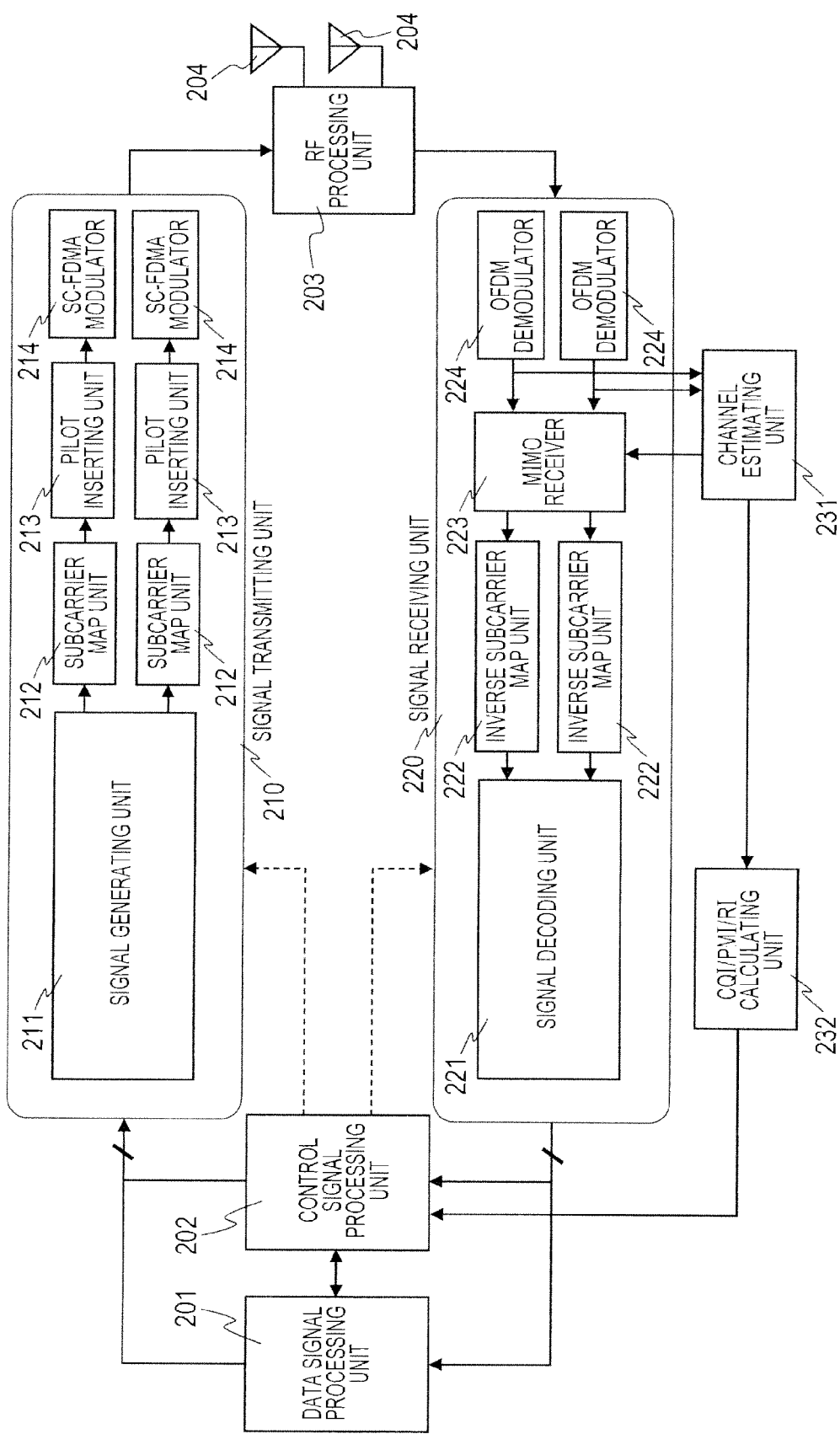
FIG. 4 is a diagram illustrating a device configuration example of a wireless communication terminal.

Subsequently, a device configuration diagram of the wireless communication terminal 200 will be described with reference to FIG. 4. User data generated by an upper layer such as a medium access control (MAC) layer in the wireless communication terminal 200, and the like is accumulated in a buffer of a data signal processing unit 201 and transmitted to the signal transmitting unit 210 as the radio resource is allocated. Meanwhile, the user data transmitted from the signal receiving unit 220 to the data signal processing unit 201 is transferred to the upper layer. Further, a control signal processing unit 202 transmits and receives even the control signal between the base station 100 and the wireless communication terminal 200 through a signal transmitting unit 210 and a signal receiving unit 220 as necessary.

When the signal transmitting unit 210 accepts a data signal from the data signal processing unit 201 or the control signal from the control signal processing unit 202, a signal generating unit 211 first performs processing such as error correction encoding, modulation, precoding, and the like, and generates a symbol transmitted from each antenna. A subcarrier map unit 212 assigns an output symbol to any one subcarrier of the SC-FDMA symbols. Subsequently, a pilot inserting unit 213 inserts a pilot symbol which the base station 100 uses to estimate a channel of uplink into an appropriate position.

Finally, an SC-FDMA modulator 214 performs DFT processing, IDFT processing, or insertion of a CP for SC-FDMA and outputs a baseband SC-FDMA signal. The signal transmitting unit 210 sends the output baseband SC-FDMA signal to an RF processing unit 203, and the RF processing unit 203 independently performs digital-analog conversion, up-convert, and amplification processing of the baseband SC-FDMA signal and transmits the corresponding signal from an antenna 204 to the base station 100.

Meanwhile, when the antenna 204 receives the signal from the base station 100, the RF processing unit 203 performs amplification processing, down-convert, and analog-digital conversion processing of the signal, and transmits the signal to an OFDM demodulator 224. The OFDM demodulator 224 performs removal of the CP and the DFT processing, transmits a pilot signal part in the output to a channel estimating unit 231, and transmits the other parts to an MIMO receiver 223. The channel estimating unit 231 performs channel estimation of downlink based on the pilot signal and transmits an estimated channel matrix to the MIMO receiver 223 and a CQI/PMI/RI calculating unit 232.

The MIMO receiver 223 performs MIMO reception processing using MMSE or MLD with respect to an output of the OFDM demodulator 224 based on the channel matrix, and transmits an output for each layer to an inverse subcarrier map unit 222. The inverse subcarrier map unit 222 performs inverse processing to the processing performed by the subcarrier map unit 112 in the base station 100 and outputs a received symbol affiliation. A signal decoding unit 221 performs demodulation and error correction decoding of the output and among signals acquired as the result, transmits a user data signal to the data signal processing unit 201 and the control signal to the control signal processing unit 202. Further, the CQI/PMI/RI calculating unit 232 calculates CQI, PMI, and RI of downlink based on the channel matrix, and notifies the calculated indications to the control signal processing unit 202.

The CQI, PMI, or RI or a threshold included in a threshold notification signal transmitted from the base station is held by the control signal processing unit 202 itself or a memory which the control signal processing unit 202 may refer to.

FIG. 9A is an operational flow when the control signal processing unit 202 in the wireless communication terminal 200 accepts the resource allocation signal 337 in FIG. 7B transmitted by the base station 100. The control signal processing unit 202 judges whether the resource allocation signal is resource allocation of downlink or uplink (372) when receiving the resource allocation signal (371). In the case of the resource allocation signal of downlink, the control signal processing unit 202 gives a command to provide for receiving data to the data signal processing unit 201 (373) and in the case of the resource allocation signal of uplink, the control signal processing unit 202 requests data transmission to the data signal processing unit 201 (374) and terminates the processing (375).

FIG. 9B is an operational flow when the control signal processing unit 202 receives the threshold notification signal transmitted by the base station 100 (327 in FIG. 7A). When the control signal processing unit 202 receives the threshold notification signal (381), the control signal processing unit 202 extracts a cooperative transmission threshold included in the signal (382) and compares the CQI of the wireless communication terminal itself with the notified cooperative transmission threshold (383). As a result, the control signal processing unit 202 judges that the wireless communication terminal itself is qualified to transmit the cooperation information to the base station when the CQI of the wireless communication terminal is smaller than the cooperative transmission threshold. Therefore, the control signal processing unit 202 requests an uplink resource for transmitting the cooperation information (384) and transmits the cooperation information notification signal by using the allocated resource (385). Meanwhile, as the comparison result in 382, when its own CQI is equal to or more than the cooperative transmission threshold, the wireless communication terminal itself judges that the wireless communication terminal is not qualified to transmit the cooperation information to the base station and just terminates the processing (386).

In FIG. 9B, the control signal processing unit 202 may perform the processing in 382 and 383, that is, compare its own CQI with the threshold and judge cooperation necessity or not at the time of receiving the threshold notification signal but at a predetermined timing of the wireless communication terminal. For example, when its own CQI is reacquired, the cooperation necessity may be judged at a timing of acquiring information indicating that the uplink resource is used less. Further, the threshold may not be received from the base station or may be held by the wireless communication terminal in advance.

Figure 5:
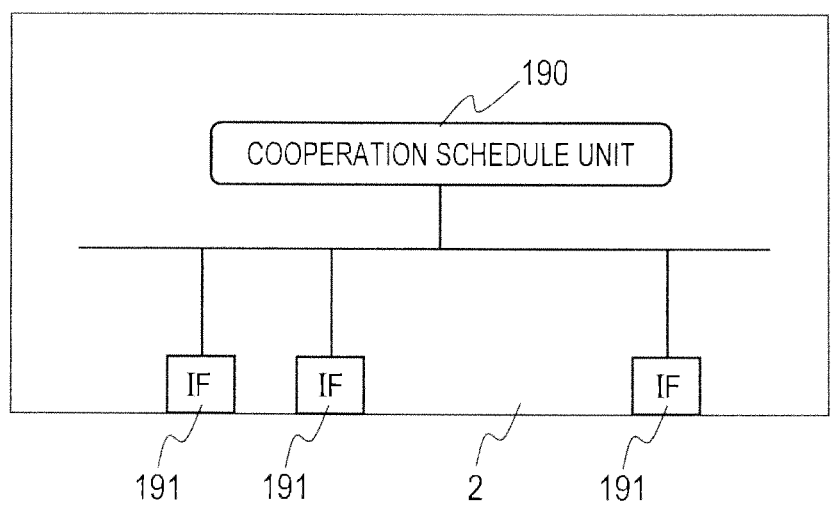
FIG. 5 is a diagram illustrating a configuration example of a gateway device.

Subsequently, the cooperation schedule unit 190 will be described with reference to FIGS. 5 and 10. As illustrated in FIG. 5, the cooperation schedule unit 190 is configured in the gateway device 2 and has even an IF 191. In addition, the cooperation schedule unit 190 is, in a wired manner, connected with the in-base station scheduler through the IF 191 and the cooperation scheduler IF 106 in the base station 100. In FIG. 2 or 5, the base station 100 and the gateway device 2 are, in the wired manner, connected with each other, but may be connected with each other in a wireless manner. Further, in the embodiment, the cooperation schedule unit 190 is configured in the gateway device 2, but may be configured in a device that controls cooperation of the plurality of base stations or any one representative base station among the plurality of base stations, in addition to the gateway device 2.

FIG. 19 is one example of a database which the cooperation schedule unit 190 refers to at the time of allocating the radio resource. An arrival time 552 of the user data, the amount of the data 553, a moment throughput 554 at the time of the cooperative transmission, and an average throughput 555, for the wireless communication terminal 200 designated by 551, are stored in the database. The cooperation scheduler 190 calculates the amount of the radio resource requiring data, based on the data arrival time 552 and the data amount 553, and determines a priority of each wireless communication terminal 200, based on the cooperation moment throughput 554 and the average throughput 555. As a method for determining the priority, a method using proportional fairness to select the wireless communication terminal 200 in which a value acquired by dividing the cooperation moment throughput 554 by the average throughput 555 is large is considered. Further, the database illustrated in FIG. 19 is one example and the database may have other configuration.

FIG. 10 is an operational flow when the cooperation schedule unit 190 accepts the cooperation scheduling request made by the in-base station scheduler 105 (305 in FIG. 6A). When the cooperation schedule unit 190 accepts the cooperation scheduling request (401), the cooperation schedule unit 190 first selects one or more wireless communication terminals 200 having the high priority (402). The selection method uses the proportional fairness using the database of FIG. 19 as described above. The subsequent processing is repeated to all wireless communication terminals requiring cooperation (403). First, the cooperation schedule unit 190 judges whether the MU-MIMO transmission is available (404) and allocates the radio resource by the MU-MIMO transmission when the MU-MIMO transmission is available (407). When the MU-MIMO transmission is unavailable, the cooperation schedule unit 190 judges whether allocation of the radio resource in the SU transmission is available (405) and allocates the radio resource in the SU transmission when the allocation of the radio resource is available (406). When the above processing is completed or when the radio resource is not allocated to the corresponding wireless communication terminal 200, the cooperation schedule unit 190 abandons the allocation of the radio resource to the wireless communication terminal 200 and selects one or more wireless communication terminal 200 having the second high priority (408). In addition, the cooperation schedule unit 190 repeats the processing until allocatable resources disappear in order to determine whether the processing for the corresponding wireless communication terminal 200 is completed (409). When the repetition is terminated, the cooperation schedule unit 190 notifies the radio resource allocation result to the in-base station scheduler 105 as the cooperation scheduling result (410), and terminates the processing (411). Further, the operational flow of the cooperation schedule unit 190 is one example, and may be based on other scheduling rule.

Figure 11A:
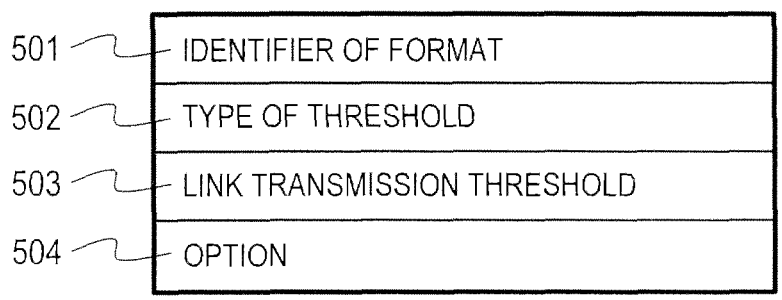
FIG. 11A is a diagram illustrating a packet format of the threshold notification signal.

Subsequently, a format of a packet required to perform the data transmission by the cooperation between the base stations will be described with reference to FIGS. 11 and 12. FIG. 11A illustrates a packet format of the threshold notification signal which the base station 100 transmits to the wireless communication terminal 200. By the packet format, a condition for performing the data transmission by the cooperation between the base stations is prescribed. An identifier 501 of the format is used for distinguishment from other control signal. A threshold type 502 is used to designate the type of the threshold stored in the signal. Examples of the type described herein may include the wideband CQI or the subband CQI. The cooperative transmission threshold is stored in a threshold 503. The cooperative transmission threshold is determined by, for example, the flow of FIG. 7A. Further, in the embodiment, the threshold is determined and updated based on CQI distribution, but a predetermined value may be set without being based on the CQI distribution.

An option 504 is a field usable in other extension.

Figure 11B:
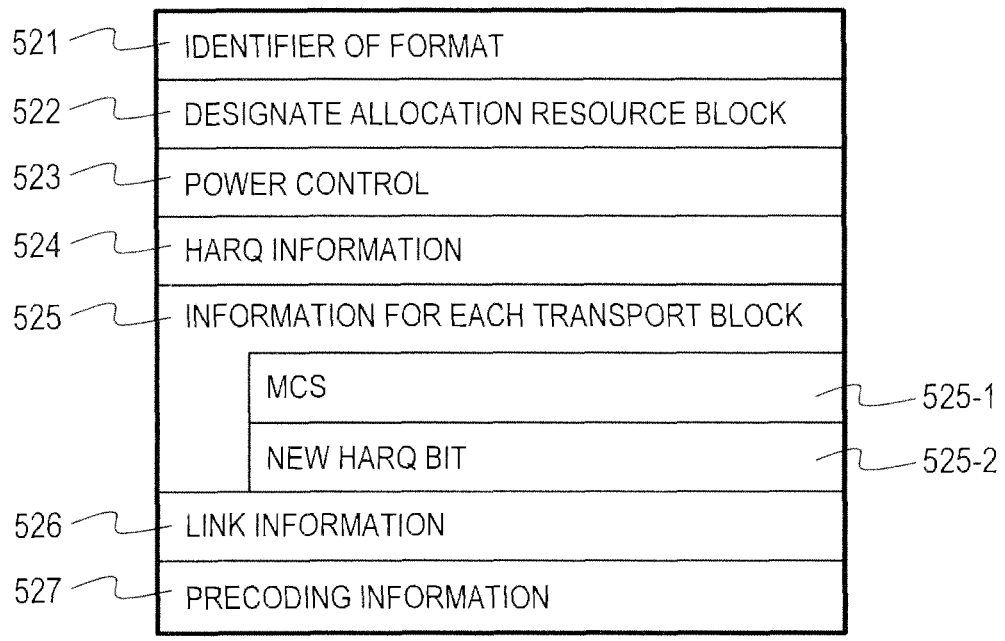
FIG. 11B is a diagram illustrating a packet format of the resource allocation signal.

FIG. 11B is a packet format of the signal (resource allocation signal) with which the base station 100 notifies the allocation result of the radio resource to the wireless communication terminal 200 to which the radio resource for the cooperative transmission is allocated by the cooperation schedule unit 190. An identifier 521 of the format is used for distinguishment from other control signal. In allocation resource block designation 522, the position of a resource block of downlink for the base stations cooperate to transmit data to the corresponding wireless communication terminal 200 is designated. Further, the resource block in this case includes a plurality of successive OFDMA symbols and a plurality of successive subcarriers in the OFDMA symbols, and is used as the unit of the allocation of the radio resource of downlink. Power control 523 is a field associated with power control. HARQ information 524 notifies a process number in hybrid automatic repeat request (HARQ) transmission. Transport block information 525 as fields as many as transmitted transport blocks includes MCS 525-1 for each transport block and a new HARQ bit 525-2 to distinguish new transmission of HARQ or not.

In cooperation information 526, a base station that performs the cooperative transmission and a transmission method used in the cooperative transmission are stored. In precoding information 527, an index of a precoding matrix used in the cooperative transmission or a quantized value is stored.

Figure 12A:
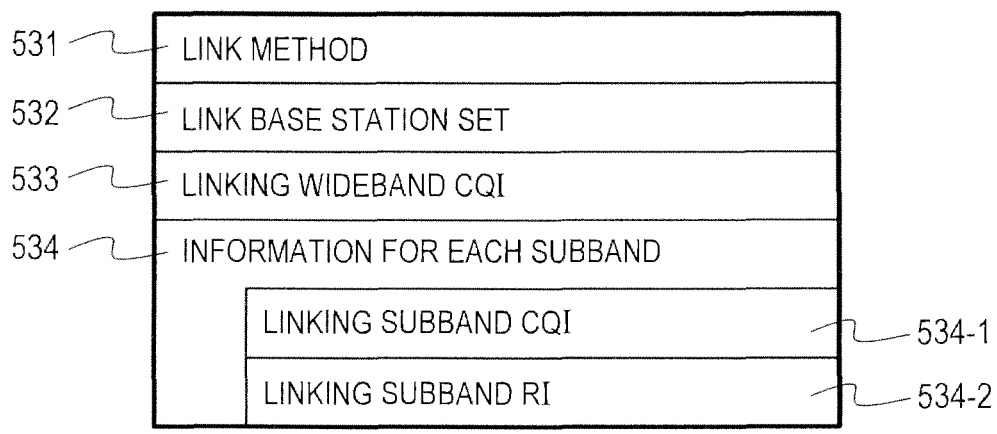
FIG. 12A is a diagram illustrating a packet format of a cooperation information notification signal.
Figure 12B:
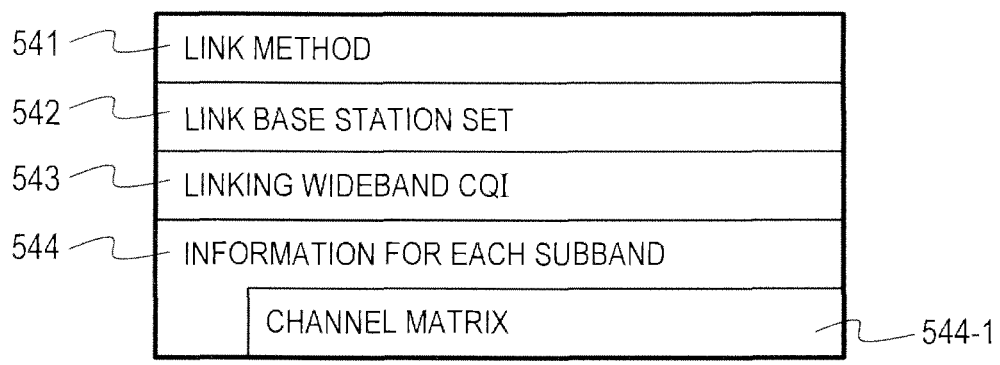
FIG. 12B is a diagram illustrating a packet format (for MU-MIMO) of the cooperation information notification signal.

FIG. 12 illustrates a packet format of the cooperation information notification signal which the wireless communication terminal 200 transmits to the cooperation schedule unit 190 through the base station 100, and FIG. 12A illustrates a packet format for open-loop MIMO and FIG. 12B illustrates a packet format for MU-MIMO. Information required for cooperation is included in the cooperation information notification signal according to the packet formats.

First, each field of the packet format of FIG. 12A will be described. A cooperation mode 531 is a field to designate a transmission mode used for the cooperative transmission. A cooperation base station set 532 notifies a set of the base stations 100 used for cooperation. A cooperation wideband CQI 533 notifies a CQI in a wide OFDMA subcarrier when the cooperative transmission designated by the cooperation mode 531 is performed. Subband information 534 includes a cooperation subband CQIs 534-1 storing a CQI for each subband when the cooperative transmission is performed and cooperation subband RIs 534-2 storing an RI for each subband when the cooperative transmission is performed, which are present as many as the number of the subbands.

Subsequently, each field of the packet format of FIG. 12B will be described. A cooperation mode 541 is a field to designate the transmission mode used for the cooperative transmission. A cooperation base station set 542 notifies a set of the base stations 100 used for cooperation. A cooperation wideband CQI 543 notifies a CQI in a wide OFDMA subcarrier when the cooperative transmission designated by the cooperation mode 541 is performed. Subband information 544 includes propagation matrices 544-1 which are fields storing values acquired by quantizing propagation matrices between the base station 100 and the wireless communication terminal 200 designated as the cooperation base station set 542, which are present as many as the subbands.

Subsequently, a sequence of the data transmission by the cooperation between the base stations by the MU-MIMO transmission will be described with reference to FIGS. 1 and 13. Until the sequence starts, it is assumed that all wireless communication terminals 200-1 to 200-6 analyze a synchronization signal and acquires information required for the data transmission to both base stations, such as synchronization information with both base stations 100-1 and 100-2 or a cell ID. Herein, it is assumed that the wireless communication terminals 200-1, 200-2, and 200-3 are affiliated to the cell of the base station 100-1 and the wireless communication terminals 200-4, 200-5, and 200-6 are affiliated in the cell of the base station 100-2. The base stations 100-1 and 100-2 periodically transmit the pilot signals (601-1 and 601-2), respectively and each wireless communication terminal monitors the pilot signals and calculates the channel matrix from both base stations 100-1 and 100-2. In calculating the channel matrix, an interference component may be interrupted by the base station (for example, the base station 100-2 in the wireless communication terminal 200-1) to which the wireless communication terminal is not affiliated, but the case is avoided by any means. Herein, as an example of the known avoidance means, a means is known, in which a pilot to which other base station avoids data transmission is spread and thereafter, the wireless communication terminal performs inverse spreading and an SINR is improved, in a resource in which a predetermined base station transmits the pilot signal and any means may be used.

Each wireless communication terminal calculates the CQI/PMI/RI at the time of performing the single base station transmission by its affiliated base station based on the calculated channel matrix, and feeds back the result to the affiliated base station by using a channel for a control signal as single transmission information (602-1 to 602-6). The base stations 101 and 102 that receive the result generate the threshold notification signal and transmit the generated threshold notification signal to the wireless communication terminals according to the flow of FIG. 7A (603-1 and 603-2). The wireless communication terminals 200-1 to 200-6 that receive the threshold notification signal compare the cooperative transmission threshold 503 in FIG. 11A included in the threshold notification signal with its own CQI, and determine whether or not to transmit the cooperation information notification signal, according to the flow of FIG. 9B.

Thereafter, the two wireless communication terminals 200-3 and 200-5 transmit the cooperation information notification signal. The wireless communication terminals 200-3 and 2005 request the uplink resource to the base stations 100-1 and 100-2, respectively in order to transmit the cooperation information notification signal (604-3 and 604-5) and the base stations 100-1 and 100-2 that receive the request allocate the uplink resource according to FIG. 7C (605-3 and 605-5). Thereafter, the wireless communication terminals 200-3 and 200-5 feed back the cooperation information notification signal (using the format of FIG. 12B) to the base stations 100-1 and 100-2 by using the allocated resource (606-3 and 606-5).

Figure 1:
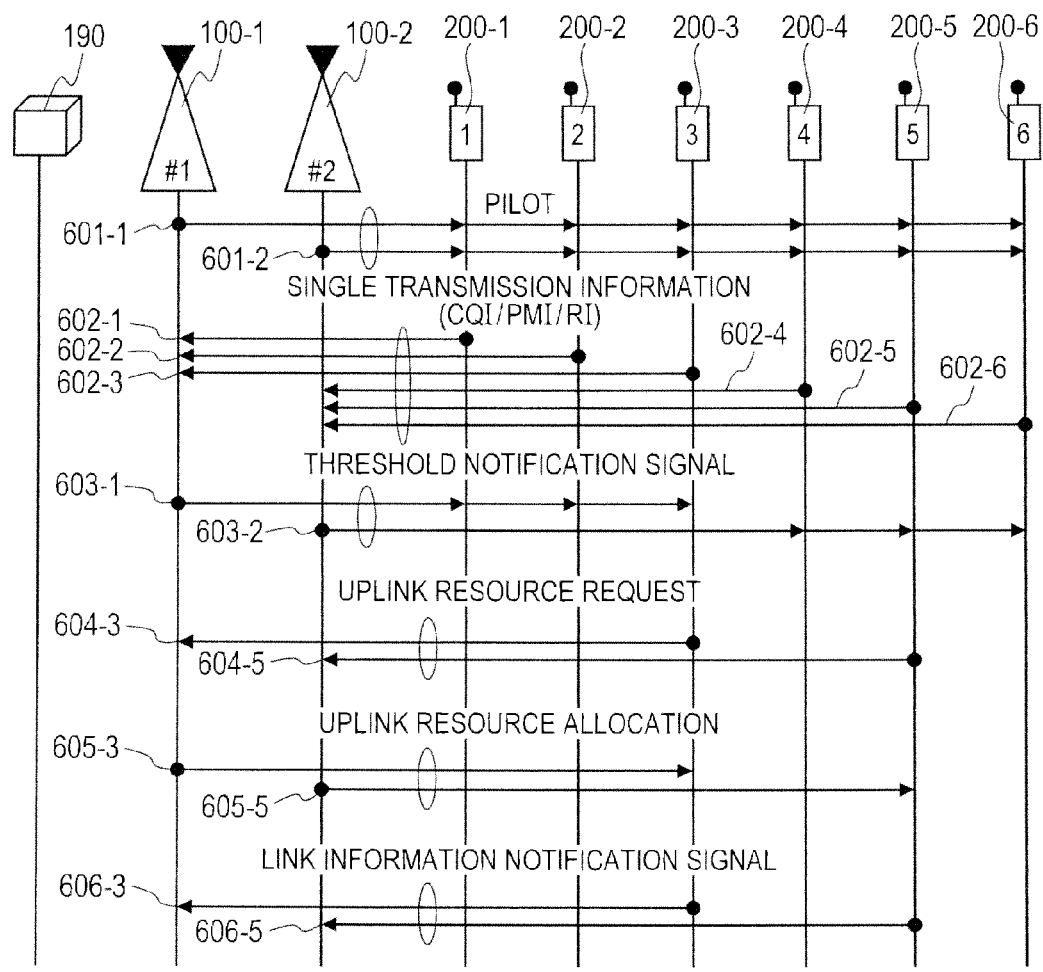
FIG. 1 is a sequence diagram until a wireless communication terminal transmits cooperation information by referring to a threshold.
Figure 13:
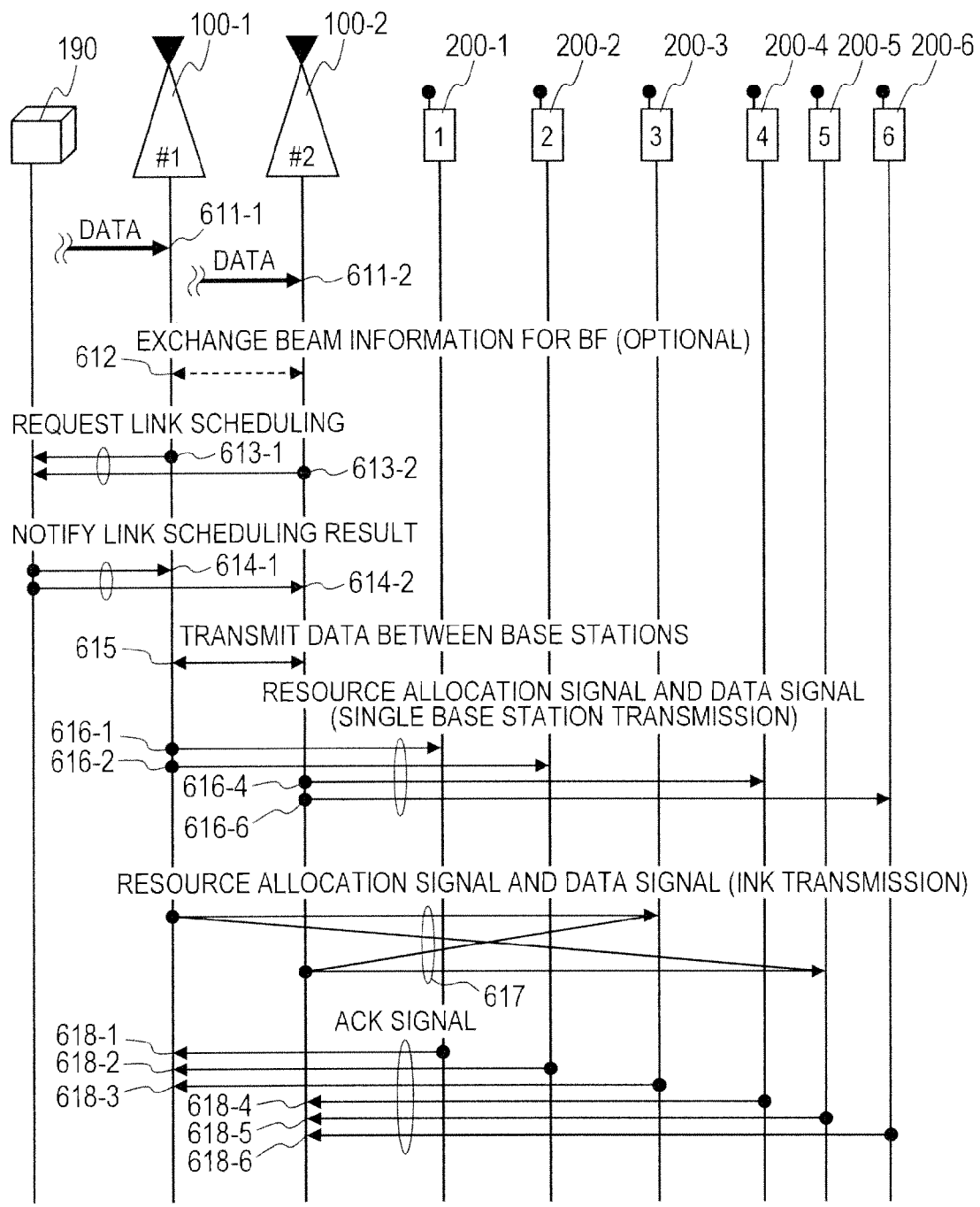
FIG. 13 is a diagram illustrating a sequence of cooperative transmission by MU-MIMO.

FIG. 13 illustrates a sequence until the cooperative transmission by the MU-MIMO transmission is actually performed after the user data for the wireless communication terminal arrives at the base station from the gateway device 2, after the sequence of FIG. 1. Since the base stations 100-1 and 100-2 in the sequence of FIG. 1 acquire the cooperation information of the wireless communication terminals 200-3 and 200-5, the cooperative transmission is attempted to be performed with respect to the two wireless communication terminals and the single base station transmission is attempted to be performed with respect to the other wireless communication terminals. First, the user data for the wireless communication terminals 200-1, 200-2, and 200-3 arrives at the base station 100-1 (611-1) and thereafter, the user data for the wireless communication terminals 200-4, 200-5, and 200-6 arrives at the base station 100-2 (611-2). The in-base station scheduler 105 of each base station performs scheduling by the single base station transmission with respect to each of the wireless communication terminals 200-1, 200-2, 200-4, and 200-6 by receiving the user data. However, in this case, the corresponding base station may exchange information on a beam for the beam forming (BF) such as a forming pattern of the beam with neighboring base stations (612), which may be used for scheduling, through the cooperation base station IF 107.

Meanwhile, the base stations 100-1 and 100-2 pass through the cooperation schedule unit IF 106 and request the cooperation scheduling to the cooperation schedule unit 190, in order to perform the cooperative transmission to the wireless communication terminals 200-3 and 200-5 (613-1 and 613-2). When the cooperation schedule unit 190 accepts the request, the cooperation schedule unit 190 allocates the radio resource by the cooperative transmission to the wireless communication terminals 200-3 and 200-5 and notifies the result to the base stations 100-1 and 100-2, according to the flow of FIG. 10 (614-1 and 614-2). The base stations 100-1 and 100-2 that receive the result exchange the user data required to perform the designated cooperative transmission with each other through the cooperation base station IF 107 (615). Thereafter, the base stations transmit the user data to the wireless communication terminal together with the resource allocation signal. In detail, the base station 100-1 performs the user data transmission by the single base station transmission with respect to the wireless communication terminals 200-1 and 200-2 (616-1 and 616-2), and the base station 100-2 performs the user data transmission by the single base station transmission with respect to the wireless communication terminals 200-4 and 200-6 (616-4 and 616-6). Further, the base station 100-1 and the base station 100-2 perform the user data transmission by the cooperative transmission with respect to the wireless communication terminals 200-3 and 200-5 by using the MU-MIMO (617). The wireless communication terminals 200-1 to 200-6 that receive the user data perform user data reception according to the resource allocation signal. Thereafter, the wireless communication terminals 200-1 to 200-3 and the wireless communication terminals 200-4 to 200-6 transmit an ACK signal indicating a reception result to the base station 100-1 and the base station 100-2, respectively (618-1 to 618-6).

As a result, only the wireless communication terminals 200-3 and 200-5 that require the cooperative transmission feed back the cooperation information to the base station to enable the cooperative transmission. Accordingly, the radio resources of uplink may be saved as compared with the case in which all of the wireless communication terminals feed back the cooperation information and the radio resources as many may be used to transmit other user data of uplink.

Further, since the cooperation schedule unit 190 has only to perform cooperation scheduler processing with respect to only the wireless communication terminals 200-3 and 200-5, a processing amount of the cooperation scheduling having the calculation amount more than the single base station transmission scheduling may be reduced.

Figure 18A:
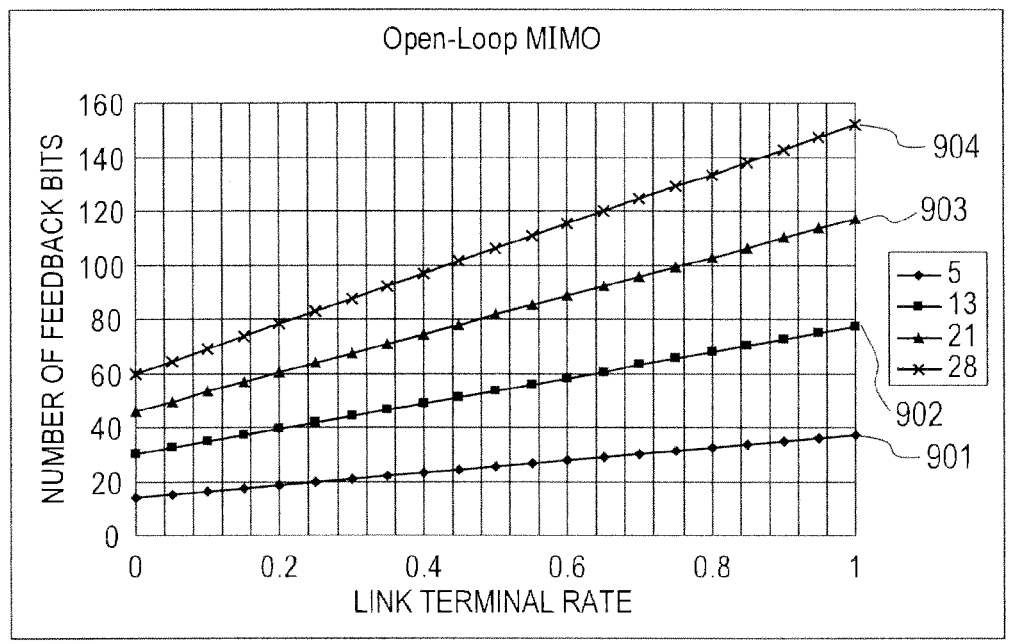
FIG. 18A is a graph illustrating how the number of bits which one wireless communication terminal uses by one-time feedback is changed when cooperation wireless communication terminal rate is changed, in a first embodiment.

FIG. 18 is a graph illustrating how a feedback amount transmitted by one wireless communication terminal is changed by a ratio (hereinafter, referred to as the cooperation wireless communication terminal rate) of the wireless communication terminal 200 that performs the cooperative transmission to all of the wireless communication terminals 200 when the embodiment is applied. FIG. 18A is a graph illustrating how the number of bits which one wireless communication terminal uses by one-time feedback is changed when the cooperation wireless communication terminal rate is changed, based on the packet format of the cooperation information notification signal of FIG. 12A. However, the cooperation mode and the cooperation base station set 531 and 532 in FIG. 12A are together set as 4 bits, the cooperation wideband CQI 533 in FIG. 12A is set as 4 bits, and the cooperation subband CQI and the cooperation RI 534-1 and 534-2 in FIG. 12A are together set as 3 bits. 901, 902, 903, and 904 in FIG. 18A represent results in which the numbers of subbands are 5, 13, 21, and 28, respectively. The case in which the cooperation wireless communication terminal rate is 1.0 has the same result as that of the case when the embodiment is not applied and by applying the embodiment, the number of feedback bits is reduced.

Figure 18B:
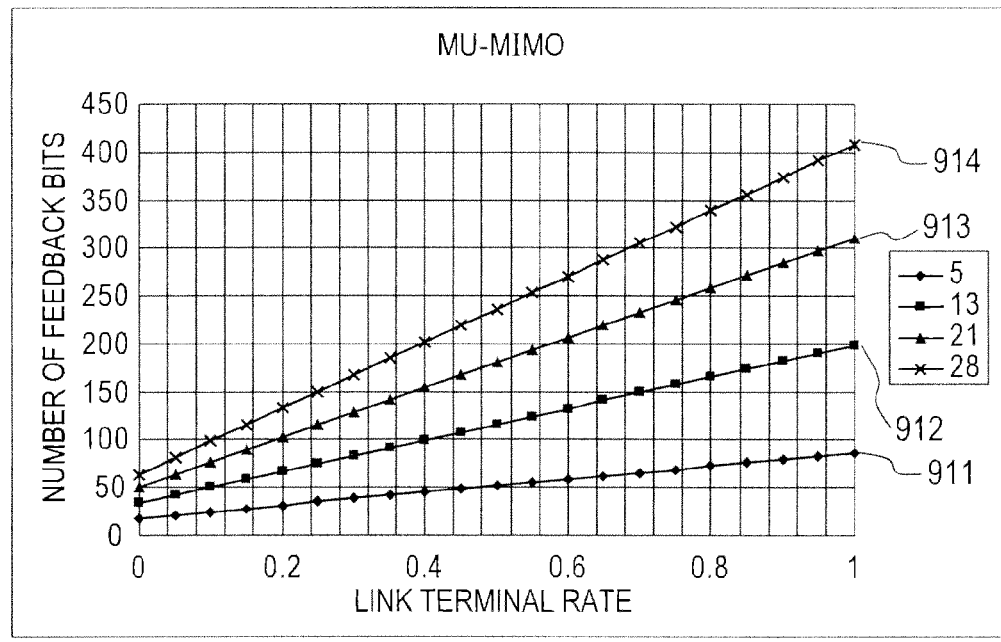
FIG. 18B is a graph illustrating a radio resource band of uplink which one wireless communication terminal uses by one-time feedback as bits when the cooperation wireless communication terminal rate is changed.

FIG. 18B is a graph illustrating a radio resource band of uplink which one wireless communication terminal uses by one-time feedback as the bits when the cooperation wireless communication terminal rate is changed, based on the packet format of the cooperation information notification signal of FIG. 12B. However, the cooperation mode and the cooperation base station set 541 and 542 in FIG. 12B are together set as 4 bits, the cooperation wideband CQI 543 in FIG. 12B is set as 4 bits, and the channel matrix 544-1 is set as 12 (6×2) bits. 911, 912, 913, and 914 in FIG. 21B represent results in which the numbers of subbands are 5, 13, 21, and 28, respectively. The case in which the cooperation wireless communication terminal rate is 1.0 has the same result as that of the case when the embodiment is not applied and by applying the embodiment, the number of feedback bits is reduced.

As described above, in the embodiment, each wireless communication terminal transmits the information required for the single base station transmission to the base station at a predetermined timing, but does not transmit the information required for the cooperative transmission at the timing. Each base station determines a threshold used to judge whether the wireless communication terminal feeds back the information required for the cooperative transmission based on the information required for the single transmission, which is collected from the wireless communication terminal. The base station dynamically changes the threshold so as to prevent the radio resource of uplink from being compressed by feeding back the information required for the cooperative transmission. The base station notifies the determined threshold to the wireless communication terminal. The wireless communication terminal that receives the threshold compares the threshold with its own communication quality, and when the communication quality is lower than the threshold, the wireless communication terminal judges that the wireless communication terminal itself is qualified to participate in the cooperative transmission and feeds back the information required for the cooperative transmission. On the contrary, when its own communication quality is higher than the threshold, the wireless communication terminal does not feed back the information required for the cooperative transmissions, and as a result, the wireless communication terminal receives the data by the single base station.

According to the embodiment, all of the wireless communication terminals need not periodically transmit the information required for the cooperative transmission to the base station and a wireless communication terminal that cannot ensure a sufficient communication quality in the single transmission, that is, the wireless communication terminal requiring the cooperative transmission transmits the information required for the cooperative transmission to the base station. Further, the base station appropriately sets the threshold to control the number of wireless communication terminals that feed back the information required for cooperation. Therefore, the amount of used radio resources of uplink by the cooperation information transmission is reduced and the amount of radio resources which may be used for uplink transmission of the user data is increased.

Further, since the cooperation schedule unit has only to allocate the radio resource by cooperative transmission to not all of the wireless communication terminals but the wireless communication terminal requiring the cooperative transmission, the increase in processing amount caused by the cooperation scheduling may be reduced.

Second Embodiment

Figure 14:
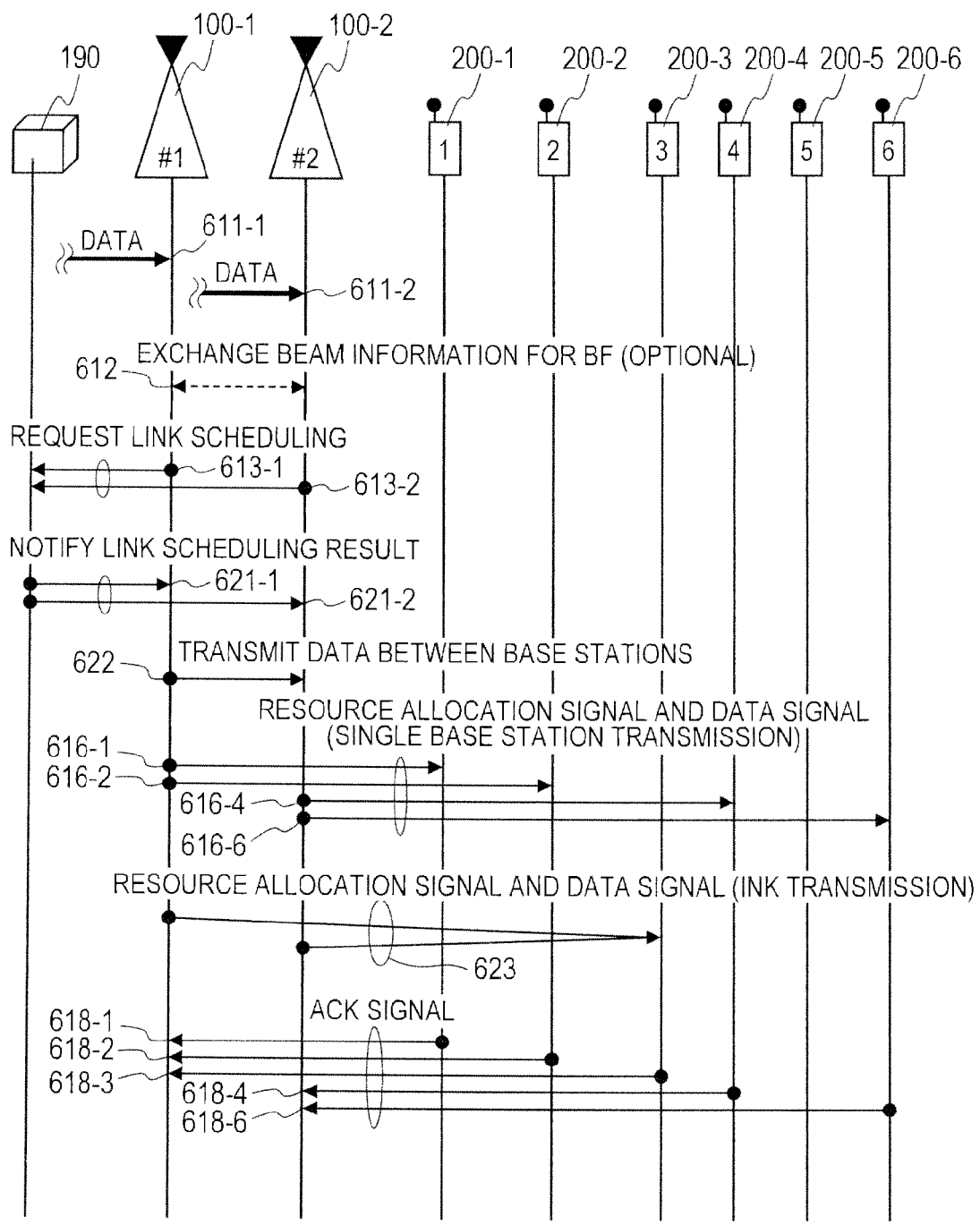
FIG. 14 is a diagram illustrating a sequence of cooperative transmission using SU transmission.

In the embodiment, a sequence of the data transmission by the cooperation of the base stations by the SU transmission will be described with reference to FIG. 14. Prior to the sequence of FIG. 14, it is assumed that the base stations 100-1 and 100-2 acquire the cooperation information notification signal from the wireless communication terminals 200-3 and 200-5 according to the sequence of FIG. 1 similarly as the first embodiment. Thereafter, in terms of the arrival of the user data at the base stations 100-1 and 100-2 (611-1 and 611-2), the exchange of the information on the beam for the BF (612), and the request of the cooperation schedule to the cooperation schedule unit 190 (613-1 and 613-2 in FIG. 14), the second embodiment is the same as the first embodiment.

In the embodiment, as the result of the cooperation scheduling, the base stations 100-1 and 100-2 perform the cooperative transmission by the SU transmission to the wireless communication terminal 200-3, determines the abandonment of data transmission to the wireless communication terminal 200-5 (actually, postpone the transmission until the next transmission timing), and notifies the gist to the base stations 100-1 and 100-2 (621-1 and 621-2). The base station 100-1 transmits the user data of the wireless communication terminal 200-3 to the base station 100-2 by receiving the purpose (622). Further, completely similar to the first embodiment, the base station 100-1 and the base station 100-2 transmit the resource allocation signal and the user data to the wireless communication terminals 200-1 and 200-2 and the wireless communication terminals 200-4 and 200-6, respectively by the single base station transmission (616-1, 616-2, 616-4, and 616-6). Further, the base stations 100-1 and 100-2 transmit the user data to the wireless communication terminal 200-3 by the cooperative transmission using the SU transmission (623). Thereafter, the wireless communication terminals 200-1 to 200-3 transmit an ACK signal indicating a result of the reception to the base station 100-1 (618-1 to 618-3) and the wireless communication terminals 200-4 and 200-6 transmit the ACK signal indicating the result of the reception to the base station 100-2 (618-4 and 618-6).

As a result, similarly as the first embodiment, since only a limited wireless communication terminal feeds back the cooperation information, the radio resources of uplink may be saved.

Further, the processing amount required for the cooperation scheduling may be reduced.

Further, the wireless communication terminal 200-5 postpones the resource allocation until the next transmission timing, but since the wireless communication terminal 200-3 may occupy two base stations 100-1 and 100-2, a throughput improvement amount in the cooperative transmission from the point of view of the wireless communication terminal 200-3 is increased as compared with the first embodiment.

Third Embodiment

Figure 15:
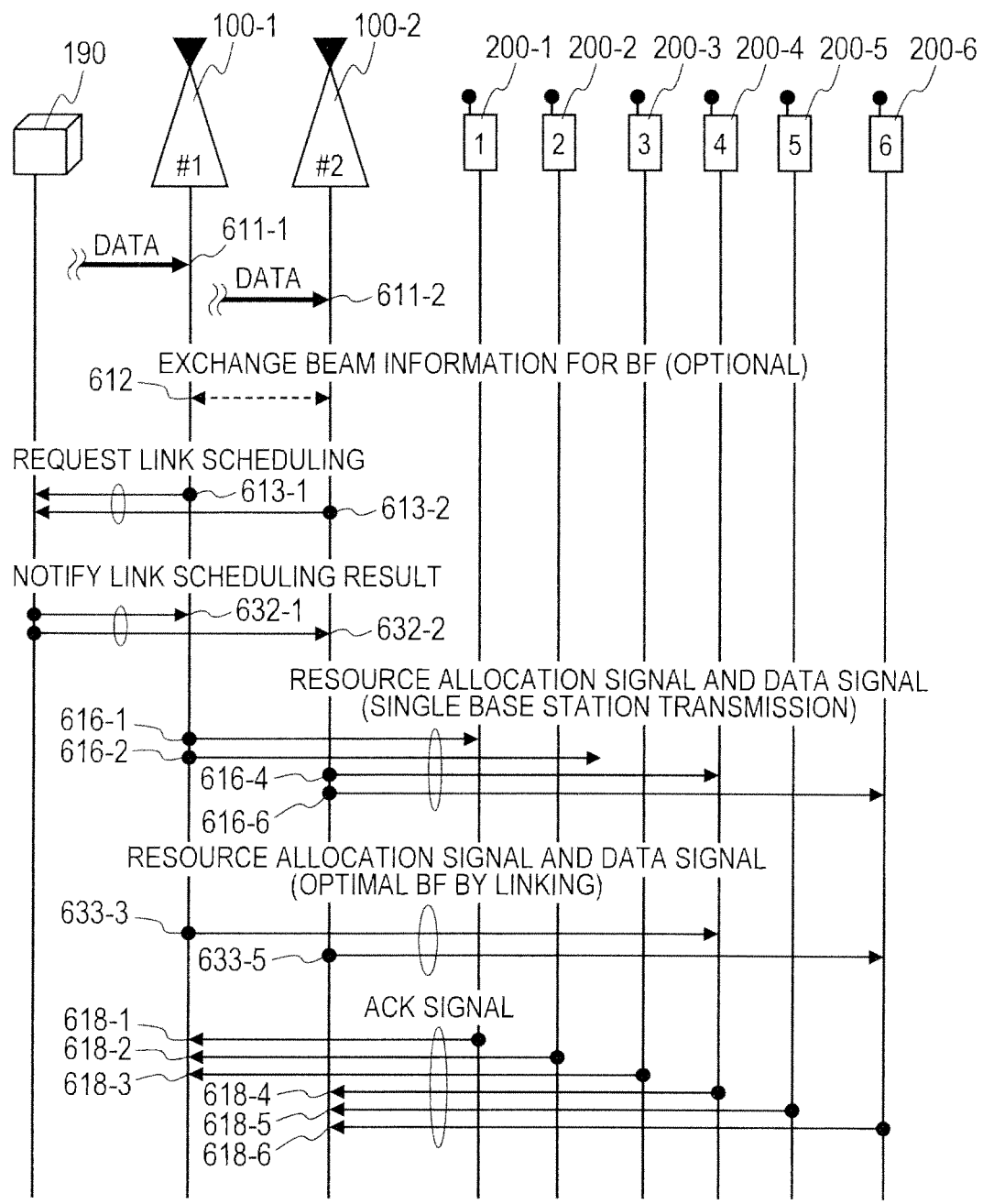
FIG. 15 is a diagram illustrating a sequence by coordinated scheduling.

In the embodiment, as one example of coordinated scheduling, a sequence when BF by the cooperation of the base stations is used will be described with reference to FIG. 15. Prior to the sequence of FIG. 15, it is assumed that the base stations 100-1 and 100-2 acquire the cooperation information from the wireless communication terminals 200-3 and 200-5 according to the sequence of FIG. 1. However, herein, is assumed that the base stations acquire a beam pattern which each wireless communication terminal desires, as the cooperation information. That is, the wireless communication terminal 200-3 notifies a candidate of a beam to maximize a signal component of the base station 100-1 which is the affiliated base station and a candidate of a beam to minimize a signal component of the base station 100-2 which is an interference base station to the base station 100-1 as the cooperation information notification signal. Similarly, the wireless communication terminal 200-5 notifies a candidate of a beam to maximize the signal component of the base station 100-2 which is the affiliated base station and a candidate of a beam to minimize a signal component of the base station 100-1 which is the interference base station to the base station 100-2 as the cooperation information notification signal. The base stations 100-1 and 100-2 request the cooperation scheduling to the cooperation schedule unit 190 by adding the information (631-1, and 631-2 in FIG. 15). The cooperation schedule unit 190 that receives the request determines an optimal beam pattern and notifies the determined optimal beam pattern to both base stations as a result of the cooperation scheduling (632-1 and 632-2). Since the cooperative transmission by joint processing is achieved in the first and second embodiments, both base stations need to exchange data with each other thereafter, but in the embodiment, the data exchange is not required in principle. The data transmission to the wireless communication terminals 200-1, 200-2, 200-4, and 200-6 is generally performed by the single base station transmission similarly as the previous embodiments (616-1, 616-2, 616-4, and 616-6). Further, the base station 100-1 transmits data to the wireless communication terminal 200-3 with a beam pattern designated as 632-1 (633-3) and the base station 100-2 transmits data to the wireless communication terminal 200-5 with a beam pattern designated as 632-2 (633-5). The wireless communication terminals that receive the data transmit ACK to their affiliated base stations, respectively (618-1 to 618-6).

As a result, as in the joint processing, since only the limited wireless communication terminal performs feedback required for the coordinated scheduling, the radio resources of uplink may be saved and the processing amount required for the cooperation scheduling may be reduced. Unlike the joint processing, since the signal is simply generated and further, transmission of the user data between the base stations is not required, the coordinated scheduling is worse than the joint processing in terms of a maximum throughput, but better than the joint processing in terms of a communication mount or a signal processing amount of backhaul.

Fourth Embodiment

Figure 16:
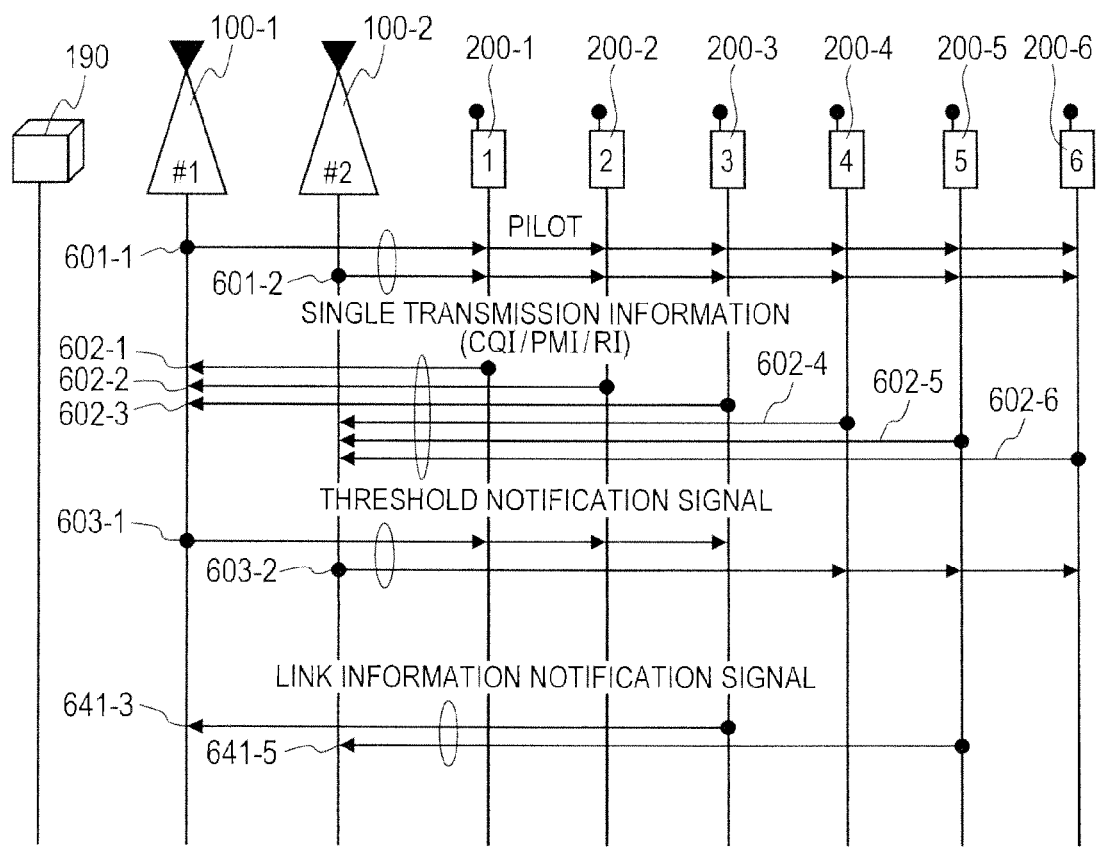
FIG. 16 is a diagram illustrating a sequence when spreading is used in the cooperation information notification signal.

In the embodiment, a sequence in which the wireless communication terminal does not request the uplink resource to the base station each time (the sequence of FIG. 1), but multiplexes the signal by using a spread code as a previously ensured resource, at the time of transmitting the cooperation information notification signal to the base station will be described with reference to FIG. 16. The embodiment is the same as FIG. 1 in that the wireless communication terminal receives the pilot from the base station (601-1, and 601-2 in FIG. 16) and feeds back the single transmission information to the base station based on the received pilot (602-1 to 602-6), and the base station that receives the single transmission information transmits the threshold notification signal (603-1 and 603-2). Thereafter, the wireless communication terminal does not request ensuring the uplink resource band to the base station but transmits the cooperation information notification signal by using the determined radio resource after spreading the cooperation information (641-3 and 641-5). The base station that receives the cooperation information notification signal appropriately performs inverse spreading and extracts an original signal.

As a result, when the cooperation information notification signal is fed back, the signal for requesting the uplink resource may be reduced.

Fifth Embodiment

In the embodiment, a method will be described, in which the base station itself notifies the wireless communication terminal of a candidate of other base station with which the base station itself intends to cooperate to at the time of transmitting the cooperative transmission threshold as the threshold notification signal to the wireless communication terminal.

Figure 17:
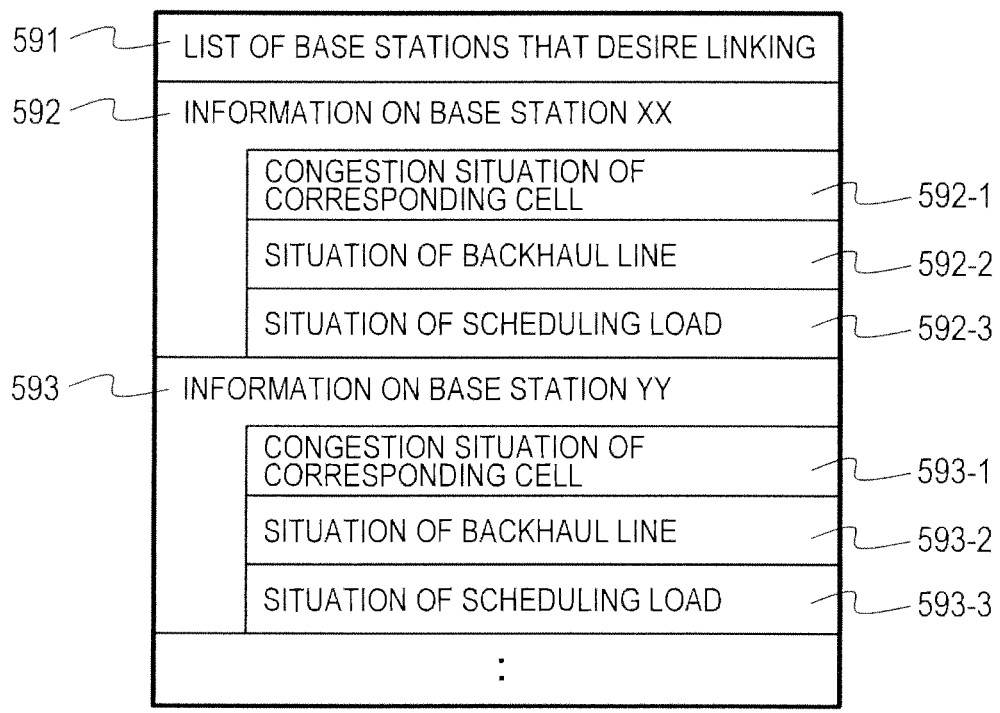
FIG. 17 is a diagram illustrating a packet format example of an option unit of the threshold notification signal.

In the embodiment, a format illustrated in FIG. 17 is stored in the option field (504) of the threshold notification signal illustrated in FIG. 11A. A field 591 of FIG. 17 stores a list of other base stations which the base station transmitting the threshold notification signal intends to cooperate with. 592 is a field that stores detailed information on a first base station (referred to as the base station xx) which the base station intends to cooperate with. In detail, the field 592 includes a field 592-1 indicating the quantity (congestion amount) of the wireless communication terminals in a cell of the base station xx, a field indicating 592-2 indicating a throughput or congestion amount of a backhaul line between the self-base station and the base station xx, and a field 592-3 indicating a state of a scheduling load in the base station xx. 593 as a field that stores detailed information on a second base station (referred to as a base station xx) which the base station intends to cooperate with includes the same fields 593-1, 593-2, and 593-3 as the base station xx. Thereafter, the field is repeated as many as the number of required base stations.

Figure 21:
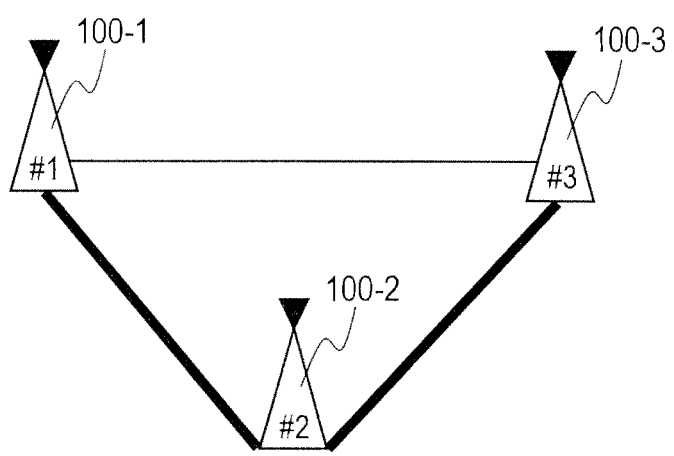
FIG. 21 is a diagram illustrating a network configuration diagram when any backhaul line is unavailable.

As illustrated in FIG. 21, a case in which it is difficult to use only the backhaul line between the base station 100-1 and the base station 100-3 (the line is congested due to a predetermined reason) is considered. In this case, the base station 100-1 stores only the base station 100-2 as the cooperation-desired base station in the field of 591 of the threshold notification signal. Similarly, the base station 100-3 stores only the base station 100-2. Meanwhile, the base station 100-2 stores both the base stations 100-1 and 100-3 as a cooperation-desired base station in the field of 591. As a result, the wireless communication terminal affiliated to the base station 100-1 feeds back only the cooperation information with the base station 100-2 and the terminal affiliated to the base station 100-3 feeds back only the cooperation information with the base station 100-2. Meanwhile, the terminal affiliated to the base station 100-2 feeds back the cooperation information with both the base stations 100-1 and 100-3.

According to the embodiment, the base station may transfer which base station the base station hopes to feed back cooperation information with to the wireless communication terminal. In the embodiments described above, in spite of a situation in which the base station 100-1 and the base station 100-3 may not cooperate with each other due to, for example, the backhaul line, and the like, there occurs the problem in that the wireless communication terminal affiliated to the base station 100-1 feeds back the cooperation information with the base station 100-3, but the problem may be avoided by the embodiment and the radio resource of uplink may be effectively used.

In various embodiments described above, the present invention has been described by using an example associated with the base station cooperation transmission according to the communication mode prescribed by LTE and LTE-advanced by a 3GPP group, but is not limited thereto and may also applied to the base station cooperation transmission by communication modes such as a WiMAX standard, and the like by other groups.

REFERENCE SIGN LIST

1: Core network
2: Gateway device
100: Base station
190: Cooperation schedule unit
200: Wireless communication terminal

The invention claimed is:

1. A wireless communication system, comprising:
a first base station;
a second base station connected with the first base station through a wired network; and
a wireless communication terminal comprising a signal processing unit configured to select at least one of a single data transmission in which data is transmitted from the first base station and a cooperative data transmission in which the first base station and the second base station cooperate to transmit data,
wherein the first base station includes a signal processing unit configured to:
generate a condition; and
notify the wireless communication terminal of the condition to cause the wireless communication terminal to determine whether the cooperative data transmission to the wireless communication terminal is required, and
the signal processing unit of the wireless communication terminal is further configured to:
compare a communication quality of a propagation path of the wireless communication terminal and the first base station with the condition; and
transmit, based on a result of the comparison, information required for the cooperative data transmission.

2. The wireless communication system according to claim 1,
wherein the condition includes a threshold of the communication quality of the propagation path in which the cooperative data transmission is available,
the signal processing unit of the wireless communication terminal is further configured to compare the communication quality of the propagation path of the wireless communication terminal and the first base station with the threshold of the quality of the propagation path included in the condition, and
the signal processing unit of the wireless communication terminal is configured to transmit information required for the cooperative data transmission based on a result of comparison between the communication quality of the propagation path of the wireless communication terminal and the first base station, and the threshold of the quality of the propagation path included in the condition.

3. The wireless communication system according to claim 2, wherein the information required for the cooperative data transmission is transmitted when it is determined that the communication quality of the propagation path is less than the threshold.

4. The wireless communication system according to claim 1, wherein the signal processing unit of the first base station is configured to simultaneously notify the condition to a plurality of wireless communication terminals.

5. The wireless communication system according to claim 4, wherein the signal processing unit of the first base station is configured to simultaneously notify the condition to the plurality of wireless communication terminals via broadcast or multicast transmission.

6. The wireless communication system according to claim 1, wherein the wireless communication terminal is configured to transmit an allocation request of a communication resource for transmitting the information required for the cooperative data transmission to the first base station,
the first base station is configured to allocate the resource to the wireless communication terminal, and
the signal processing unit of the wireless communication terminal is configured to transmit the information required for the cooperative data transmission by using the allocated resource.

7. The wireless communication system according to claim 1, wherein the signal processing unit of the wireless communication terminal is configured to transmit the information required for the cooperative data transmission by using a predetermined common resource.

8. The wireless communication system according to claim 1, wherein the signal processing unit of the first base station is configured to notify a condition including designation of a base station which the first base station cooperates with, selected from among a plurality of designated base stations, and
the wireless communication terminal is configured to notify the first base station of the information required for the cooperative data transmission which includes the base station selected from among the designated second base stations.

9. The wireless communication system according to claim 1, wherein the information required for the cooperative data transmission includes at least one of a channel matrix, a channel quality at the time of using the mode, the number of ranks of MIMO, and a desired precoding matrix.

10. The wireless communication system according to claim 1,
wherein the wireless communication terminal is configured to transmit single data transmission information required for the single data transmission with the first base station to the first base station, and
the first base station is configured to receive the single data transmission information, and set the condition based on the single data transmission information.

11. The wireless communication system according to claim 1,
wherein the single data transmission information is propagation path state information indicating a state of the propagation path between the first base station and the wireless communication terminal, the signal processing unit of the first base station is configured to update the condition based on the propagation path state information from a plurality of wireless communication terminals, and the signal processing unit of the first base station is configured to notify the updated condition to the wireless communication terminal.

12. A first base station performing a data transmission to a wireless communication terminal, comprising a signal processing unit configured to:
generate a threshold;
notify the wireless communication terminal of the threshold to cause the wireless communication terminal to determine whether a cooperative data transmission to the wireless communication terminal is required; and
perform the cooperative data transmission when receiving a request for the cooperative data transmission form the wireless communication terminal.

13. The first base station according to claim 12, wherein the signal processing unit is further configured to receive a propagation path state value indicating a state of a propagation path between the wireless communication terminal and the first base station, and determine the threshold based on the propagation path state value.

14. The first base station according to claim 13,
wherein the threshold is a threshold of the value indicating the state of the propagation path between the wireless communication terminal and the first base station,
the signal processing unit is further configured to:
refer to the propagation path state value received from the plurality of wireless communication terminals and decrease the threshold when a number of terminals with a propagation path state value less than the threshold reaches a predetermined number,
increase and update the threshold when the number of terminals with the propagation path state value less than the threshold does not reach the predetermined number, and
notify the updated threshold to the wireless communication terminal.

15. The first base station according to claim 12,
wherein the signal processing unit is further configured to notify designation of a base station which the first base station cooperates with, among a plurality of second base stations,
the request for the cooperative data transmission includes selection of the designated second base station, and the signal processing unit is further configured to perform the cooperative data transmission with the base station according to the selection.

16. A wireless communication terminal which is capable of receiving data from a base station, comprising:
memory storing a propagation path state value indicating a state of a propagation path between the base station and the wireless communication terminal and a threshold received from the base station; and
a signal processing unit configured to:
determine, based on the threshold received from the base station, whether a cooperative data transmission to the wireless communication terminal is required; and
transmit, to the base station, cooperation notification information to request performing a data transmission by cooperation with another base station based on the propagation path state value.

17. The wireless communication terminal of claim 16, wherein the signal processing unit is further configured to transmit the cooperation notification information to the base station based on the propagation path state value and a predetermined threshold.

18. The wireless communication terminal according to claim 17, wherein the signal processing unit is further configured to transmit the cooperation notification information to the base station when the propagation path state value is smaller than the threshold.

19. The wireless communication terminal according to claim 16, wherein the signal processing unit is further configured to:
transmit a resource allocation request for transmitting the cooperation notification information to the base station, and
transmit the cooperation information by using a resource allocated from the base station.

20. The wireless communication terminal according to claim 16, wherein the signal processing unit is further configured to:
receive cooperation base station designation information including designation of said another base station for performing the cooperative data transmission from the base station, and
notify, to the base station, the cooperation notification information including a base station selected from the designated base station.

* * * * *